(12) United States Patent
Bivolarsky et al.

(10) Patent No.: US 9,445,109 B2
(45) Date of Patent: Sep. 13, 2016

(54) COLOR ADAPTATION IN VIDEO CODING

(71) Applicant: Microsoft Technology Licensing, LLC, Redmond, WA (US)

(72) Inventors: Lazar Bivolarsky, Cupertino, CA (US); Jekaterina Reeder, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 1003 days.

(21) Appl. No.: 13/653,245

(22) Filed: Oct. 16, 2012

(65) Prior Publication Data
US 2014/0105277 A1    Apr. 17, 2014

(51) Int. Cl.
*H04N 7/26* (2006.01)
*H04N 19/18* (2014.01)
(Continued)

(52) U.S. Cl.
CPC ............ *H04N 19/18* (2014.11); *H04N 19/126* (2014.11); *H04N 19/154* (2014.11); *H04N 19/162* (2014.11); *H04N 19/164* (2014.11);
(Continued)

(58) Field of Classification Search
CPC ............ H04N 19/126; H04N 19/154; H04N 19/162; H04N 19/164; H04N 19/18; H04N 19/36; H04N 19/46; H04N 19/463
USPC ....................................... 375/240.03, E7.139
IPC ............... H04N 19/154, 19/162, 19/164, 19/19, H04N 19/36, 19/46, 19/463
See application file for complete search history.

(56) References Cited

U.S. PATENT DOCUMENTS

| 5,426,512 A * | 6/1995 | Watson ................ H04N 19/176 375/E7.13 |
| 6,353,686 B1 * | 3/2002 | Daly ....................... G06T 9/005 382/239 |

(Continued)

FOREIGN PATENT DOCUMENTS

| EP | 1995971 A1 | 11/2008 |
| EP | 2498497 A1 | 9/2012 |

(Continued)

OTHER PUBLICATIONS

"International Search Report & Written Opinion for PCT Patent Application No. PCT/US2013/065150", Mailed Date: Jan. 8, 2014, Filed Date: Oct. 16, 2013, 12 Pages.

(Continued)

*Primary Examiner* — William C Vaughn, Jr.
*Assistant Examiner* — Naod Belai
(74) *Attorney, Agent, or Firm* — Tom Wong; Micky Minhas

(57) ABSTRACT

A video bitstream is received from an encoder, comprising encoded image portions each having a common form representing components of a channel in a color space. Each of a plurality of the encoded image portions comprises a different set of quantized values of the components, including at least a value of a first of the components being quantized from amongst a first scheme of quantized levels. Further, the received bitstream comprises a look-up table mapping the quantized levels of the first scheme to at least partially de-quantized respective levels. A de-quantizer uses the look-up table received in the bitstream to at least partially de-quantize the different quantized values of the first component in a plurality of the image portions, by converting the quantized values of the first component to at least partially de-quantized values corresponding to ones of the at least partially de-quantized levels of the first scheme.

20 Claims, 13 Drawing Sheets

(51) Int. Cl.
*H04N 19/46* (2014.01)
*H04N 19/463* (2014.01)
*H04N 19/126* (2014.01)
*H04N 19/154* (2014.01)
*H04N 19/162* (2014.01)
*H04N 19/164* (2014.01)
*H04N 19/36* (2014.01)

(52) U.S. Cl.
CPC .......... *H04N 19/46* (2014.11); *H04N 19/463* (2014.11); *H04N 19/36* (2014.11)

(56) References Cited

U.S. PATENT DOCUMENTS

| | | | |
|---|---|---|---|
| 6,463,100 B1 | 10/2002 | Cho et al. | |
| 6,546,049 B1 | 4/2003 | Lee | |
| 7,272,557 B2 | 9/2007 | Odell | |
| 7,420,570 B2 | 9/2008 | Xu et al. | |
| 7,791,748 B2 | 9/2010 | Izumi et al. | |
| 7,984,179 B1* | 7/2011 | Huang | H04N 21/2662 709/231 |
| 7,995,649 B2 | 8/2011 | Zuo et al. | |
| 8,077,769 B2 | 12/2011 | Krishnan | |
| 8,135,226 B2 | 3/2012 | Fukuhara et al. | |
| 8,189,028 B2 | 5/2012 | Bang et al. | |
| 8,270,468 B2 | 9/2012 | Doser et al. | |
| 8,411,753 B2* | 4/2013 | Cha | H04N 19/34 375/240.01 |
| 2001/0005426 A1 | 6/2001 | Song et al. | |
| 2002/0168007 A1* | 11/2002 | Lee | H04N 19/176 375/240.03 |
| 2004/0234140 A1* | 11/2004 | Nonaka | G06F 3/14 382/232 |
| 2005/0093880 A1 | 5/2005 | Kim | |
| 2006/0039619 A1* | 2/2006 | Feng | G06T 9/005 382/239 |
| 2006/0133479 A1 | 6/2006 | Chen et al. | |
| 2006/0197777 A1* | 9/2006 | Cha | H04N 19/34 345/600 |
| 2007/0258518 A1* | 11/2007 | Tu | H04N 19/176 375/240.03 |
| 2008/0198920 A1 | 8/2008 | Yang et al. | |
| 2008/0222688 A1 | 9/2008 | Han | |
| 2009/0006955 A1* | 1/2009 | Wang | G06F 3/048 715/702 |
| 2010/0027619 A1 | 2/2010 | Doser et al. | |
| 2010/0061447 A1 | 3/2010 | Tu et al. | |
| 2010/0074328 A1 | 3/2010 | Zuo et al. | |
| 2011/0103467 A1 | 5/2011 | Wedi et al. | |
| 2011/0228856 A1 | 9/2011 | Bjoentegaard | |
| 2012/0020549 A1 | 1/2012 | Lee et al. | |
| 2012/0236021 A1* | 9/2012 | Parmar | G09G 3/2044 345/597 |
| 2012/0268479 A1* | 10/2012 | Parmar | G09G 3/2048 345/597 |
| 2013/0089150 A1 | 4/2013 | Tanchenko | |
| 2013/0188734 A1* | 7/2013 | Kim | H03M 7/4018 375/240.25 |
| 2013/0301496 A1 | 11/2013 | Nagaraj et al. | |
| 2014/0105278 A1 | 4/2014 | Bivolarsky | |

FOREIGN PATENT DOCUMENTS

| | | |
|---|---|---|
| WO | 2006/007279 A2 | 1/2006 |
| WO | WO-2011101448 | 8/2011 |

OTHER PUBLICATIONS

Rehman, et al., "SSIM-Inspired Perceptual Video Coding for HEVC", In IEEE International Conference on Multimedia and Expo, Jul. 9, 2012, pp. 497-502.

"International Search Report & Written Opinion for PCT Patent Application No. PCT/US2013/065152", Mailed Date: Dec. 17, 2013, Filed Date: Oct. 16, 2013, 12 Pages.

"Final Office Action", U.S. Appl. No. 13/653,296, Dec. 4, 2015, 24 pages.

Reinhard, "High Dynamic Range Imaging", Morgan Kaufmann, 2nd Edition, 2010, p. 130-133, 462-464.

"Non-Final Office Action", U.S. Appl. No. 13/653,296, Jul. 29, 2015, 21 pages.

Timmerer, et al., "Interoperable Adaptive Multimedia Communication", Retrieved at http://www-itec.uni-klu.ac.at/publications/mmc/TR_InteroperableAdaptiveMultimediaCommunication_Jan2005.pdf, Jan. 2005, pp. 7.

"ISO WG (Working Group) 11 (MGEG)", Available at: www.itscj.ipsj.or.jp/sc29/open/29view/29n106511.doc, (Jul. 2009), 145 pages.

Bivolarski, "ITU-T's SG (Study Group)16 Q(Question)", Available at http://wftp3.itu.int/av-arch/video-site/0906_LG/VCEG-AL37.zip, (Jul. 5, 2009).

Bivolarski, Lazar M., et al., "Design Considerations for Computationally Constrained Two-Way Real-Time Video Communication", *Application of Digital Image Processing XXXII*, A.G. Tescher, ed., in Proceedings of SPIE, 7443:7440I-1-74430II-17, (2009),17 pages.

Tourapis, Alexis M., "Quantization Offset Matrices for Fidelity Range Extensions", *In Proceedings of Joint Video Team (JVT) of ISO/IEC MPEG & ITU-T VCEG(ISO/IEC JTC1/SC29/WG11 and ITU-T SG16 Q.6) 12th Meeting:* Redmond, Washington USA, (Jul. 21, 2004),21 pages.

Watson, et al., "DVQ A Digital Video Quality Metric Based on Human Vision", *In Journal of Electronic Imaging*, vol. 10, Issue 1, (Jan. 2001), 16 pages.

* cited by examiner

| DC | $AC_{0,1}$ | $AC_{0,2}$ | ... | $AC_{0,7}$ |
|---|---|---|---|---|
| $AC_{1,0}$ | $AC_{1,1}$ | $AC_{1,2}$ | ... | $AC_{1,7}$ |
| $AC_{2,0}$ | $AC_{2,1}$ | $AC_{2,2}$ | ... | $AC_{2,7}$ |
| . | . | . | . | . |
| . | . | . | . | . |
| . | . | . | . | . |
| $AC_{7,0}$ | $AC_{7,1}$ | $AC_{7,2}$ | ... | $AC_{7,7}$ |

Figure 8

| DC | $AC_{0,1}$ | $AC_{0,2}$ | ... | $AC_{0,7}$ |
|---|---|---|---|---|
| $AC_{1,0}$ | $AC_{1,1}$ | $AC_{1,2}$ | ... | $AC_{1,7}$ |
| $AC_{2,0}$ | $AC_{2,1}$ | $AC_{2,2}$ | ... | $AC_{2,7}$ |
| ⋮ | ⋮ | ⋮ | ⋱ | ⋮ |
| $AC_{7,0}$ | $AC_{7,1}$ | $AC_{7,2}$ | ... | $AC_{7,7}$ |

$$\begin{pmatrix} a_{0,0} & a_{0,1} & a_{0,2} & a_{0,3} & a_{0,4} & a_{0,5} & a_{0,6} & a_{0,7} \\ a_{1,0} & a_{1,1} & a_{1,2} & a_{1,3} & a_{1,4} & a_{1,5} & a_{1,6} & a_{1,7} \\ a_{2,0} & a_{2,1} & a_{2,2} & a_{2,3} & a_{2,4} & a_{2,5} & a_{2,6} & a_{2,7} \\ a_{3,0} & a_{3,1} & a_{3,2} & a_{3,3} & a_{3,4} & a_{3,5} & a_{3,6} & a_{3,7} \\ a_{4,0} & a_{4,1} & a_{4,2} & a_{4,3} & a_{4,4} & a_{4,5} & a_{4,6} & a_{4,7} \\ a_{5,0} & a_{5,1} & a_{5,2} & a_{5,3} & a_{5,4} & a_{5,5} & a_{5,6} & a_{5,7} \\ a_{6,0} & a_{6,1} & a_{6,2} & a_{6,3} & a_{6,4} & a_{6,5} & a_{6,6} & a_{6,7} \\ a_{7,0} & a_{7,1} & a_{7,2} & a_{7,3} & a_{7,4} & a_{7,5} & a_{7,6} & a_{7,7} \end{pmatrix}$$

Figure 9

| DC | $AC_{0,1}$ | $AC_{0,2}$ | ... | $AC_{0,7}$ |
|---|---|---|---|---|
| $AC_{1,0}$ | $AC_{1,1}$ | $AC_{1,2}$ | ... | $AC_{1,7}$ |
| $AC_{2,0}$ | $AC_{2,1}$ | $AC_{2,2}$ | ... | $AC_{2,7}$ |
| . | . | . | . | . |
| . | . | . | . | . |
| . | . | . | . | . |
| $AC_{7,0}$ | $AC_{7,1}$ | $AC_{7,2}$ | ... | $AC_{7,7}$ |

$$\begin{pmatrix} LUT & a_{0,1} & a_{0,2} & a_{0,3} & a_{0,4} & a_{0,5} & a_{0,6} & a_{0,7} \\ a_{1,0} & a_{1,1} & a_{1,2} & a_{1,3} & a_{1,4} & a_{1,5} & a_{1,6} & a_{1,7} \\ a_{2,0} & a_{2,1} & a_{2,2} & a_{2,3} & a_{2,4} & a_{2,5} & a_{2,6} & a_{2,7} \\ a_{3,0} & a_{3,1} & a_{3,2} & a_{3,3} & a_{3,4} & a_{3,5} & a_{3,6} & a_{3,7} \\ a_{4,0} & a_{4,1} & a_{4,2} & a_{4,3} & a_{4,4} & a_{4,5} & a_{4,6} & a_{4,7} \\ a_{5,0} & a_{5,1} & a_{5,2} & a_{5,3} & a_{5,4} & a_{5,5} & a_{5,6} & a_{5,7} \\ a_{6,0} & a_{6,1} & a_{6,2} & a_{6,3} & a_{6,4} & a_{6,5} & a_{6,6} & a_{6,7} \\ a_{7,0} & a_{7,1} & a_{7,2} & a_{7,3} & a_{7,4} & a_{7,5} & a_{7,6} & a_{7,7} \end{pmatrix}$$

*LUT:*

| Quantization index | Maps to: |
|---|---|
| 7 | $L_{15}$ |
| 6 | $L_{14}$ |
| ... | ... |
| 0 | $L_7$ |
| ... | ... |
| -5 | $L_2$ |
| -6 | $L_1$ |
| -7 | $L_0$ |

Figure 11

| DC | $AC_{0,1}$ | $AC_{0,2}$ | ... | $AC_{0,7}$ |
|---|---|---|---|---|
| $AC_{1,0}$ | $AC_{1,1}$ | $AC_{1,2}$ | ... | $AC_{1,7}$ |
| $AC_{2,0}$ | $AC_{2,1}$ | $AC_{2,2}$ | ... | $AC_{2,7}$ |
| . | . | . | . | . |
| . | . | . | . | . |
| . | . | . | . | . |
| $AC_{7,0}$ | $AC_{7,1}$ | $AC_{7,2}$ | ... | $AC_{7,7}$ |

$$\begin{pmatrix} LUT & \underline{P}_{0,1} & \underline{P}_{0,2} & \underline{P}_{0,3} & \underline{P}_{0,4} & \underline{P}_{0,5} & \underline{P}_{0,6} & \underline{P}_{0,7} \\ \underline{P}_{1,0} & \underline{P}_{1,1} & \underline{P}_{1,2} & \underline{P}_{1,3} & \underline{P}_{1,4} & \underline{P}_{1,5} & \underline{P}_{1,6} & \underline{P}_{1,7} \\ \underline{P}_{2,0} & \underline{P}_{2,1} & \underline{P}_{2,2} & \underline{P}_{2,3} & \underline{P}_{2,4} & \underline{P}_{2,5} & \underline{P}_{2,6} & \underline{P}_{2,7} \\ \underline{P}_{3,0} & \underline{P}_{3,1} & \underline{P}_{3,2} & \underline{P}_{3,3} & \underline{P}_{3,4} & \underline{P}_{3,5} & \underline{P}_{3,6} & \underline{P}_{3,7} \\ \underline{P}_{4,0} & \underline{P}_{4,1} & \underline{P}_{4,2} & \underline{P}_{4,3} & \underline{P}_{4,4} & \underline{P}_{4,5} & \underline{P}_{4,6} & \underline{P}_{4,7} \\ \underline{P}_{5,0} & \underline{P}_{5,1} & \underline{P}_{5,2} & \underline{P}_{5,3} & \underline{P}_{5,4} & \underline{P}_{5,5} & \underline{P}_{5,6} & \underline{P}_{5,7} \\ \underline{P}_{6,0} & \underline{P}_{6,1} & \underline{P}_{6,2} & \underline{P}_{6,3} & \underline{P}_{6,4} & \underline{P}_{6,5} & \underline{P}_{6,6} & \underline{P}_{6,7} \\ \underline{P}_{7,0} & \underline{P}a_{,1} & \underline{P}_{7,2} & \underline{P}_{7,3} & \underline{P}_{7,4} & \underline{P}_{7,5} & \underline{P}_{7,6} & \underline{P}_{7,7} \end{pmatrix}$$

$$\underline{P}_{n,m} = [\ \underline{p}^{0}_{n,m}\ ,\ \ldots\ ,\ \underline{p}^{l-1}_{n,m}\ ]$$

Where $l <$ no. quantization levels

COLOR ADAPTATION IN VIDEO CODING

BACKGROUND

Digital cameras tend to capture images with a high color depth—far higher than is typically needed in practice. For example, some cameras capture samples at a depth of 10 or even 12 bits per R, G and B channel, giving a total depth of 30 to 36 bits in RGB space.

The human eye on the other hand is usually not capable of distinguishing this many colors. From research into human vision, it has been estimated that a typical human can only perceive about 2 million different colors. That corresponds to a total color depth of about 20 bits (6 to 7 bits per channel).

If the captured data is to be encoded for transmission over a network, then high color depth information incurs a very high bitrate, as well as a high processing burden in the encoding. Similarly, if the data is to be encoded for storage then a high color depth incurs a lot of memory resource.

For this reason, raw image data captured from a camera is often quantized for the purpose of video encoding. This reduces the number of bits required to encode the video, for example reducing the bitrate required in a bitstream to be transmitted over a network, e.g. as part of a live video call such as a video VoIP (Voice over IP) call; or reducing the number of bits required to store the video in memory.

SUMMARY

Various embodiments relate to adapting color levels used in the context of video encoding and/or decoding, for instance as part of a live video call over a network.

According to one or more embodiments of the present invention, there is provided a receiving apparatus comprising a receiver and a de-quantizer. The receiver is configured to receive a video bitstream from an encoder. The bitstream comprises encoded image portions each having a common form representing a plurality of components of a channel in a color space. Each of a plurality of the encoded image portions comprises a different set of quantized values of the components. These include at least a value of a first of said components being quantized from amongst a first scheme of quantized levels. Further, the bitstream received from the encoder comprises a look-up table mapping the quantized levels of the first scheme to at least partially de-quantized respective levels.

The de-quantizer is operatively coupled to the receiver, and configured to use the look-up table received in the bitstream from the encoder to at least partially de-quantize the different quantized values of the first component in a plurality of the image portions. This is done by converting the quantized values of the first component to at least partially de-quantized values corresponding to ones of the at least partially de-quantized levels of the first scheme. The receiving apparatus is configured to output a video image to a screen based on the conversion by said de-quantizer.

By including a look-up table of quantization levels in the bitstream, embodiments of the present invention allow for quantization levels that are non-uniform in proportion with one another, and for these non-uniform levels to be adapted in a manner that is not necessarily restricted to a small number of predetermined models.

In one or more further embodiments, there is provided transmitting apparatus comprising an input configured to receive a video signal from a video camera, and encoder, a quantizer and a transmitter. The encoder is configured to generate a bitstream from said video signal. The generated bitstream comprises encoded image portions each having a common form representing a plurality of components of a channel in a color space. Each of a plurality of the encoded image portions comprises a different set of quantized values of the components. These include at least a value of a first of said components being quantized from amongst a first scheme of quantized levels.

The quantizer is configured to generate the quantized values, and the transmitter is configured to transmit the encoded bitstream to a decoder of a receiving apparatus. Further, the quantizer is configured to receive an indication concerning a screen of the receiving apparatus. Based on said indication, it determines a look-up table mapping the quantized levels of the first scheme to at least partially de-quantized respective levels. The transmitting apparatus is configured to insert the look-up table into the bitstream for use at the receiving apparatus in at least partially de-quantizing the different quantized values of the first component for a plurality of the image portions.

In further embodiments, there may be provided one or more corresponding computer program products embodied on a tangible computer-readable storage device, configured so as when executed on a processor to perform operations in accordance with any of the above apparatus features. In yet further embodiments there may be provided a network element and/or a storage device carrying a bitstream encoded in accordance with the above features.

BRIEF DESCRIPTION OF THE DRAWINGS

For a better understanding of the described embodiments and to show how they may be put into effect, reference is made by way of example to the accompanying drawings in which:

FIG. 8 is a schematic representation of a transformed block with quantization information, FIG. 9 is another schematic representation of a transformed block with quantization information, FIG. 11 is another schematic representation of a transformed block with quantization information.

DETAILED DESCRIPTION

Figure 1:
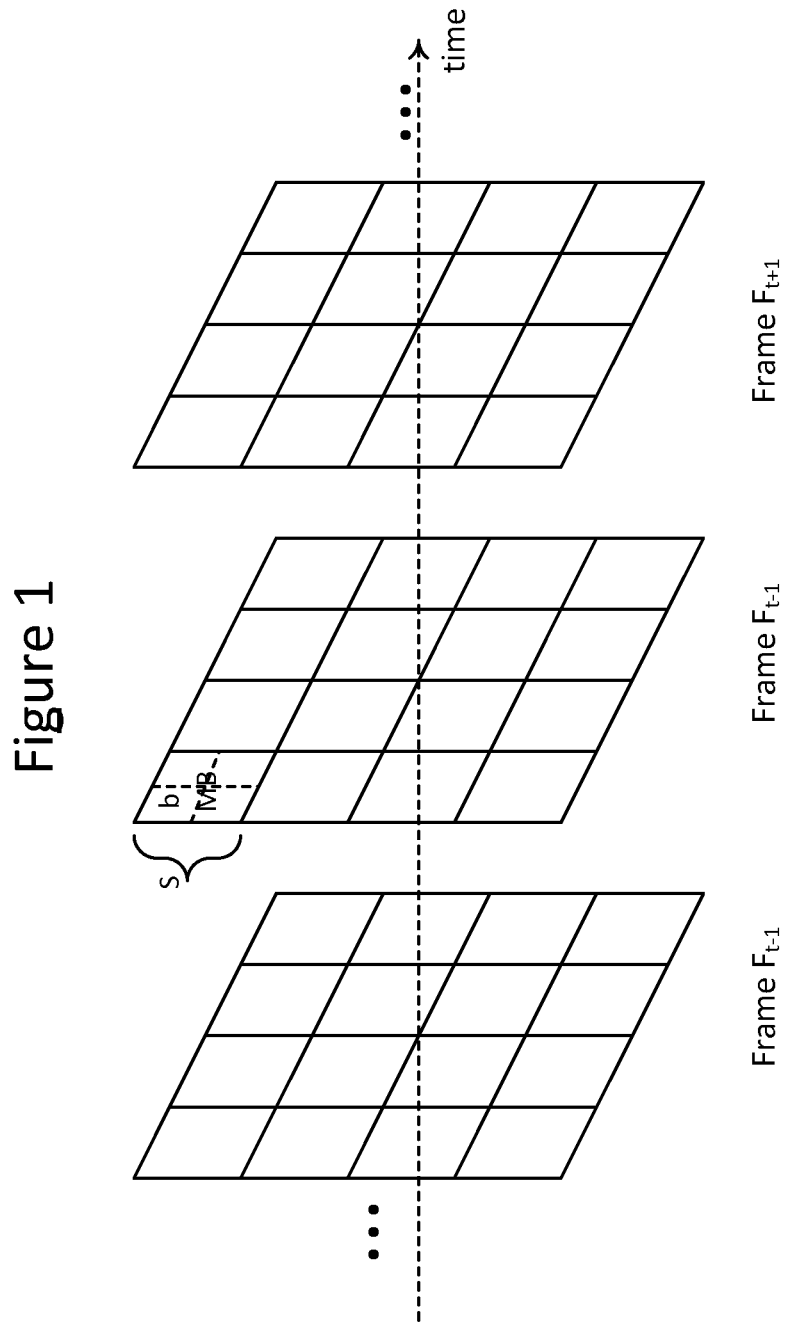
FIG. 1 is a schematic representation of a video stream.

Color depth refers to the number of bits used to represent colors. Color space refers to a system of channels for representing colors, e.g. consisting of a red channel (R), green channel (G) and a blue channel (B) in RGB space; or a luminance channel (Y) and two chrominance channels (U, V) in a YUV color space. A given color can be represented by a group of values in color space, one for each of the channels. Each value could for example be a sample input from a camera, or a quantized, transformed or encoded sample derived from the input from a camera.

Different formats may also exist for expressing a color in a particular type of color space. For example in a YUV 4:4:4 format, for every group of four luminance samples Y there is a corresponding group of four chrominance samples U and another corresponding group of four chrominance samples V. In a YUV 4:2:0 format on the other hand, for every group of four luminance samples Y there is a corresponding group of two chrominance samples made up of one U sample and one V sample, i.e. chrominance values are shared by four pixels in a block.

Color depth may be considered in terms of the total number of bits used to represent a color in a particular color space, or the number of bits used to represent a constituent color value or sample of a particular channel of a color space.

As mentioned, digital cameras tend to capture images with a high color depth—far higher than is typically needed in practice. For example, some cameras capture samples at a depth of 10 or even 12 bits per R, G and B channel, giving a total depth of 30 to 36 bits in RGB space. The human eye on the other hand is usually not capable of distinguishing this many colors. From research into human vision, it has been estimated that a typical human can only perceive about 2 million different colors. That corresponds to a total color depth of about 20 bits (6 to 7 bits per channel). If the captured data is to be encoded for transmission over a network, then high color depth information incurs a very high bitrate, as well as a high processing burden in the encoding. Similarly, if the data is to be encoded for storage then a high color depth incurs a lot of memory resource.

For this reason, raw image data captured from a camera is often quantized for the purpose of video encoding. This reduces the number of bits required to encode the video, for example reducing the bitrate required in a bitstream to be transmitted over a network, e.g. as part of a live video call such as a video VoIP (Voice over IP) call; or reducing the number of bits required to store the video in memory.

Quantization is the process of taking a continuous value and converting it into a value represented on a scale of discrete steps, or in practice since all digital input data is discrete on some level of granularity, the process of converting a value represented on a higher-granularity scale (represented using more bits) to a lower-granularity scale (more coarse, represented using fewer bits). The process of quantization reduces the number of necessary bits in the frequency domain since it is applied over transform coefficients (see below). In the case of color values, this will comprise a process of converting a value represented on a higher-depth scale to a lower-depth scale. For example, quantization would describe taking the approximately continuous 10 to 12 bit input sample from a digital camera and converting it to an 8-bit value.

Quantized values are smaller in magnitude and so require fewer bits to encode, and less processing resource in the encoding process. The sacrifice is reduced color depth—even when de-quantized at the decoder side, there will remain large steps between the levels a value or sample can take. There is therefore a trade-off to be made between the resources incurred by the encoding and the accuracy with which an image can be reconstructed again when decoded.

Ideally, a system designer will aim to achieve a quantization that minimizes bitrate whilst still not quite resulting in a degree of distortion that is perceptible to the human eye. Alternatively if resources are more limited or anticipated to be more limited, the aim may be to minimize bitrate in a manner that leaves a still tolerable distortion.

In a conventional quantization process, each value is scaled down by a certain factor, and then scaled up again by that factor in the de-quantization applied at the decoder side.

FIG. 1 gives a schematic illustration of an input video signal captured from a camera, and divided into portions ready to be encoded by a video encoder so as to generate an encoded bitstream. The signal comprises a moving video image divided in time into plurality of frames (F), each frame representing the image at a different respective moment in time ( . . . t−1, t, t+1 . . . ). Within each frame, the frame is divided in space into a plurality of portions each representing a plurality of pixels. The portions may for example be referred to as blocks. In certain schemes, the frame is divided and sub-divided into different levels of portion or block. For example each frame may be divided into macroblocks (MB) and each macroblock may be divided into blocks (b), e.g. each block representing a region of 8×8 pixels within a frame and each macroblock representing a region of 2×2 blocks (16×16 pixels). In certain schemes each frame can also be divided into slices (S), each comprising a plurality of macroblocks.

A block in the input signal may initially be represented in the spatial domain, where each of each channel is represented as a function of spatial position within the block, e.g. each of the Y, U and V channels being a function of Cartesian coordinates x and y, Y(x,y), U(x,y) and V(x,y). This is a more intuitive representation, whereby each block or portion is represented by a set of pixel values at different spatial coordinates, e.g. x and y coordinates, so that each channel of the color space is represented in terms of a particular value at a particular location within the block, another value at another location within the block, and so forth.

The block may however be transformed into a transform domain representation as part of the encoding process, typically a spatial frequency domain representation (sometimes just referred to as the frequency domain for brevity). In the frequency domain the block is represented in terms of a system of frequency components representing the variation in each color space channel across the block, e.g. the variation in each of the luminance Y and the two chrominances U and V across the block. That is to say, for each channel, a block comprises a component of one particular frequency of variation across the block, another component of another frequency of variation across the block, and so forth, in both the horizontal and vertical directions (or potentially some other coordinate). The coefficients represent the size of the different frequency components making up the block.

Mathematically speaking, in the frequency domain each of the channels (each of the luminance and two chrominance channels or such like) is represented as a function of spatial frequency, having the dimension of 1/length in a given direction. For example this could be denoted by wavenumbers $k_x$ and $k_y$ in the horizontal and vertical directions respectively, so that the channels may be expressed as $Y(k_x, k_y)$, $U(k_x, k_y)$ and $V(k_x, k_y)$ respectively. The block is therefore transformed to a set of coefficients which may be considered to represent the amplitudes of different spatial frequency terms which can be considered to make up the block. Possibilities for such transforms include the Discrete Cosine transform (DCT), Karhunen-LoeveTransform (KLT), or others. E.g. for a block of M×N pixels at discrete x and y coordinates within the block, a DCT would transform the luminance Y(x,y) to a set of frequency domain coefficients $Y(k_x, k_y)$:

$$Y(k_x, k_y) = \sum_{x=0}^{M-1} \sum_{y=0}^{N-1} Y(x, y) \cos\left[\frac{\pi k_x}{2M}(2x+1)\right] \cos\left[\frac{\pi k_y}{2N}(2y+1)\right]$$

And inversely, the x and y representation Y(x,y) can be determined from a sum of the frequency domain terms summed over $k_x$ and $k_y$. Hence each block can be represented as a sum of one or more different spatial frequency terms having respective coefficients $Y(k_x, k_y)$ (and similarly for U and V). The transform domain may be referred to as the frequency domain (in this case referring to spatial frequency).

Figure 6:
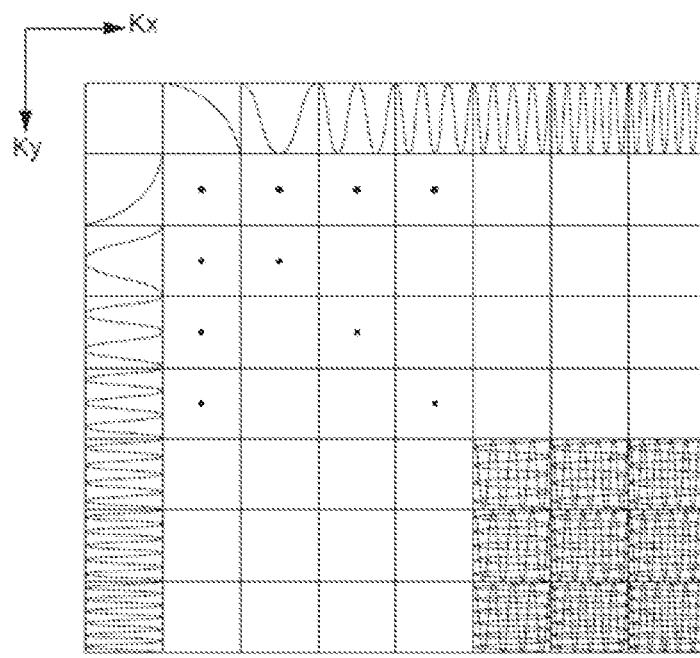
FIG. 6 is a schematic representation of a transformed block of a video image.

Referring to FIGS. 6 and 8, typically each channel of each block (b) is represented by a DC coefficient and a set of AC coefficients. For each channel (e.g. each of Y, U and V) the DC coefficient represents a component that is constant over the block, typically the average or other such overall measure; and each of the AC coefficients represents the size of a corresponding frequency component in the frequency domain, which may be represented mathematically as the amplitude of a corresponding term in a series of periodic terms, e.g. as shown in the equation above. For example FIGS. 6 and 8 could represent the luminance coefficients Y (and there would be another set of coefficients for each of the chrominance channels U and V).

The diagram at the top of each of FIGS. 6 and 8 is a schematic representation of an example block (b) comprising 8×8 coefficients of a particular channel (e.g. the Y coefficients) in the frequency domain. As shown schematically at the bottom of FIG. 6, each of the AC coefficients then represents the contribution from a different respective periodic component (e.g. sinusoidal) of a respective frequency in either the horizontal or vertical direction (for the avoidance of doubt, note that each entry in the diagram at the bottom of FIG. 6 is a miniature schematic representation of the variation over the whole block contributed by that component—the row and column in FIG. 6 do not mean the x and y position in the spatial domain).

E.g. so in the example shown, the coefficient $AC_{0,1}$ is the amplitude of a first frequency component in the horizontal direction, the coefficient $AC_{0,2}$ is the amplitude of a second frequency component in the horizontal direction, and so forth, and the coefficient $AC_{0,m}$ is the amplitude of the $m^{th}$ frequency component in the horizontal direction; and the coefficient $AC_{1,0}$ is the amplitude of the first frequency component in the vertical direction, the coefficient $AC_{2,0}$ is the amplitude of the second frequency component in the vertical direction, etc. and the coefficient $AC_{n,0}$ is the amplitude of the $n^{th}$ frequency component in the vertical direction; where m is an index of wave number $k_x$ and n is an index of wave number $k_y$. At some index n and m, the coefficient $AC_{n,m}$ is the amplitude of a component having the $n^{th}$ and $m^{th}$ frequency in the vertical and horizontal directions respectively.

Each of these coefficients is then quantized down by a quantization factor as described previously. the result of transforming the blocks before quantization is that in the frequency domain many of the coefficients will tend be small and quantize to zero or to small values, which can be encoded more efficiently (with fewer bits).

Some existing schemes allow a matrix of quantization factors to be provided to the decoder, with each entry in the matrix corresponding to a particular frequency component in a block. Within each block, the coefficient for each component is thus scaled by the respective quantization factor for that component.

The diagram at the bottom of FIG. 8 shows an example matrix of quantization factors for an 8×8 block. In the quantization the coefficient DC or $AC_{m,n}$ for each component ($k_y$, $k_y$) is divided by a respective factor for that component, and then at the decoder side each factor $a_{m,n}$ is used to multiply the coefficients DC or $AC_{m,n}$ back up in order to de-quantize. Note that whilst different factors may be supplied for different frequency components, for a given frequency component ($k_y$, $k_y$) the same factor $a_{m,n}$ is used to scale the coefficient of that component for each of multiple blocks (there is not one matrix sent per block).

The use of a quantization matrix allows more perceptually relevant components to be quantized with a higher color depth (less quantization) than components that are less perceptually relevant (which are quantized with a lower color depth, i.e. more severe quantization).

There is further scope for controlling the balance between the resources incurred by the encoding (e.g. bitrate and processor cycles) and the perceived distortion experienced due to quantization.

Even in the existing case where a quantization matrix is sent to the decoder, this still only enables a fixed scaling algorithm, i.e. all the different possible values for a given component are only scaled by the same multiplicative factor. This means the quantisation steps for that component still all remain in the same proportion to one another, i.e. the quantization steps for a particular component are still uniform (e.g. see FIG. 7).

However, uniform quantization steps are not necessarily desirable.

In an existing system, a quantization bin size distribution is adapted based on parameters such as an amount of motion in the video or the distance of the viewer from the screen. The parameter can be determined and updated dynamically during encoding of a given video signal, and may be fed back dynamically if appropriate. This means the quantizer can switch "on the fly" between different perceptual models.

However, this still only enables the encoder and decoder to switch between a relatively small number of predetermined models, that have to be pre-programmed in advance at the decoder.

Embodiments of the present invention provide a system for adapting color space levels in a non-uniform fashion based on information of those levels being included along with the bitstream, allowing greater flexibility to preserve more detail in certain components where relevant whilst forfeiting detail in other less relevant components.

By including a look-up table of quantization levels in the bitstream, embodiments of the present invention can allow for quantization levels that are non-uniform in proportion with one another, and for these non-uniform levels to be adapted in a manner that is not necessarily restricted to a small number of predetermined models.

Human vision is not necessarily the limiting factor when it comes to the question of what color depth is worth encoding. Instead, in some situations the screen at the decoder side can be the more limiting factor, or at least a comparably limiting factor.

Some monitors have a color depth of 8 bits per channel which gives a total color depth of 24 bits, corresponding to about 17 million different colors. This many colors are beyond the perception of most humans, so in this case human vision is the limiting factor in the color depth that can be perceived. However, some other types of screen such as those on mobile phones may have a much smaller color depth, perhaps as low as 5 bits per channel, giving a total color depth of 15 bits which corresponds to just under 33,000 different colors. This is far fewer colors than a human is capable of perceiving, so in this case the screen is the limiting factor on the color depth, not the innate capability of human vision. Other monitors might use 6 or 7 bits per channel, which gives around the same number of colors as most humans are capable of perceiving. Even some big screen HD (high definition) LCD monitors may be limited to levels of grey and the other components that are still approximately distinguishable to a viewer as discrete levels.

Further, human vision is not linear. For example, for a given frequency component of a given channel (e.g. Y, U or V), if the component is sent to the viewer quantized and encoded with 256 different levels then (all else being equal) the viewer might only be able to distinguish something like 64 different levels, but the perceived levels will not all be linearly spaced. To accommodate for this phenomenon, the manufacturer of an LCD or LED matrix display screen will usually tune the intrinsic behaviour of the screen to a certain perceptual distribution. That is, for a decoded signal input to the screen on any given channel, the screen will be tuned such that a given size of step in the decoded input signal (e.g. the step between adjacent digital values) will result in different sized steps in the physical output of the screen on that channel depending on where the value of the decoded input signal lies within the range of possible values of that signal. For example, say a display screen takes an 8-bit input signal for the red channel, giving 256 possible levels, the screen may be designed so that the intensity in the red light emitted will vary in finer steps relative to a given step in the 8-bit digital signal in the middle of that signal's range, and coarser steps in intensity relative to the same size step in the input signal at the edges of the range; and similarly for green and blue channels, or potentially for the channels of another color space. However, different manufacturers tune their displays to different perceptual distributions. For example some manufacturers favour a tuning that appears more colorful to the average viewer, whilst some other manufacturers prefer a more subtly colored tuning.

There is therefore a question of whether to encode video based for example on 5, 6 or 8 bits per channel. Any depth could be chosen, but retaining a higher color depth in the encoded bitstream could end up being wasteful depending on the screen at the decoder side, whereas compromising too far on color depth could result in perceptible quantization distortion worse than is intrinsic in at least some screens.

Embodiments of the present invention provide a system and method for adapting the distribution of color levels used during video encoding and decoding, enabling more efficient use of the available bits so that, whatever color depth is chosen, the perceptual impact of this compromise can be reduced. At the encoder side, the levels are adapted according to the capability of the decoder-side screen to display distinguishable colors.

In embodiments, video is quantized down to 6 bits per channel for the purpose of encoding. The 6 bits here refer to the number of distinguishable colors (or levels of grey in the case of luminance) and not to the dynamic range. Note also that color depth per channel refers herein to the number of bits to represent a coefficient or component for a given channel, not the number of bits to represent a whole block.

Many current LCD, LED and smartphone monitors use 6 bits per color channel to display an 8-bit per channel that is encoded in the received bitstream. This process is done by converting 8-bit YUV to RGB 565 for example. This is the third level of conversion of the color data between the camera sensor and the display—the first is done at Beyer pattern level where the 10-12 bit camera RGB is converted to standard 8-bit RGB (in most cases), then the RGB is converted to 4:2:0 YUV (for example), then encoded, transmitted and decoded, then the 8-bit YUV is converted to RGB 565 using the device color characteristics.

In embodiments of the present invention, all of these color space conversions can be done once at the beginning of the processing by removing the information that wold not be necessary for the display and therefore reducing the need for extra processing complexity and bitrate. This would be useful for example in peer-to-peer or other VoIP communications. In the case of a many-to-one conference, the client with the lowest display bit depth may form a base layer and the rest enhanced layers. The display technologies not the product model numbers may be the basis for these differences, therefore the necessary layers to support even large conferences would be relatively small.

To convert down to six bits rather than eight, the level visibility at the specific monitor is measured subjectively so as to develop a conversion table. The conversion table is then applied after the data acquisition step. After the sensor capture, the image data is converted to six bits while skipping the common 10-12 bit Beyer RGB to 8-bit YUV conversion so as to produce a 6-bit YUV output signal.

Various embodiments are not limited to a depth of 6 bits per channel, and there are several possibilities to redefine the YUV color space with reduced bit depth. Depending on the individual case, some example definitions are: YUV 555 (15 bits in total), YUV 655 (16 bits in total), YUV 665 or YUV 656 (17 bits in total), YUV 666 (18 bits in total), YUV 766 (19 bits in total), and YUV 776 or YUV 767 (20 bits in total); where YUV 555 would mean that Y samples are truncated to 5 bits each and U and V have 5 bits per sample, and YUV 655 would mean that Y samples are truncated to 6 bits each and U and V have 5 bits per sample, etc.

Adapting the quantization table and the quantization parameter (QP) factor of an existing codec, firstly, it would be desirable to scale down the corresponding quantization tables and the respective QP factors when using the current codec to process the stream; and secondly, the data may stay in YUV 8-bit space shifted right. For example 00xxxxxx would represent a sample of a channel Y, U or V. The range of these values would be four times smaller than in the 8-bit case Whatever conversion is chosen, in various embodiments of the invention the conversion table is applied to the DC coefficients of each block in the transform domain, and the table is transmitted to the decoder in the encoded bitstream.

In further embodiments of the present invention, quantization is also adapted to the monitor for AC coefficients. This is achieved by measuring the visibility of different frequency components of a transform as they are displayed on a specific monitor, and determining a methodology for measurement of coefficient visibility.

Many of the current LCD, LED and smartphone monitors use "dithering" to enhance the display capabilities but this has a negative effect on the transform AC coefficients visibility.

Various embodiments will now be discussed in more detail in relation to FIGS. 2 to 16.

Figure 2:
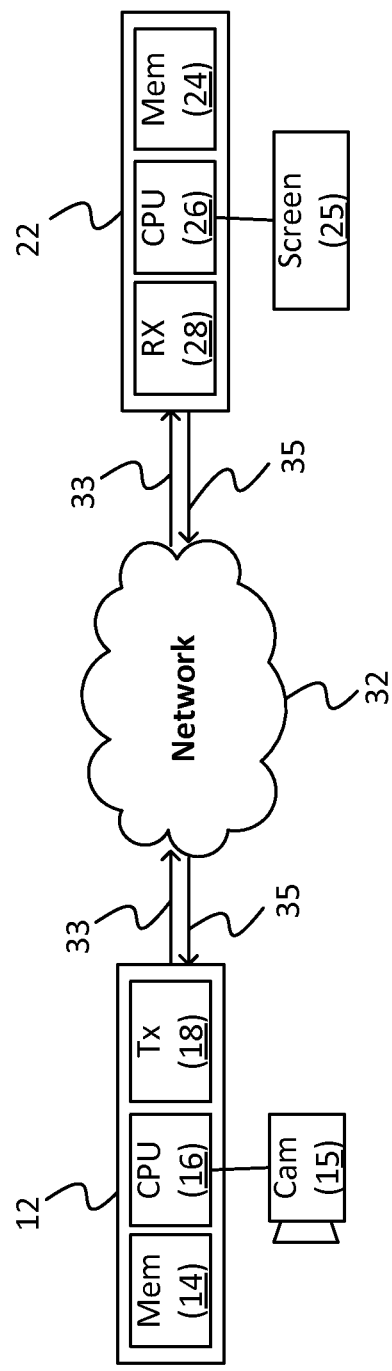
FIG. 2 is a schematic block diagram of a communication system.

An example communication system, in accordance with one or more embodiments, is illustrated schematically in the block diagram of FIG. 2. The communication system comprises a first, transmitting terminal 12 and a second, receiving terminal 22. For example, each terminal 12, 22 may comprise one of a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a tangible, computer-readable storage medium 14 such as a flash memory or other electronic memory, a magnetic storage device, and/or an optical storage device. The first terminal 12 also comprises a processing apparatus 16 in the form of a processor or CPU having one or more cores; a transceiver such as a wired or wireless modem having at least a transmitter 18; and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a tangible, computer-readable storage medium 24 such as an electronic, magnetic, and/or an optical storage device; and a processing apparatus 26 in the form of a CPU having one or more cores. The second terminal comprises a transceiver such as a wired or wireless modem having at least a receiver 28; and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage medium 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage medium on the second terminal 22 stores at least a video decoder arranged to be executed on its own processing apparatus 26. When executed the decoder receives the encoded video stream from the receiver 28 and decodes it for output to the screen 25. A generic term that may be used to refer to an encoder and/or decoder is a codec.

Figure 3:
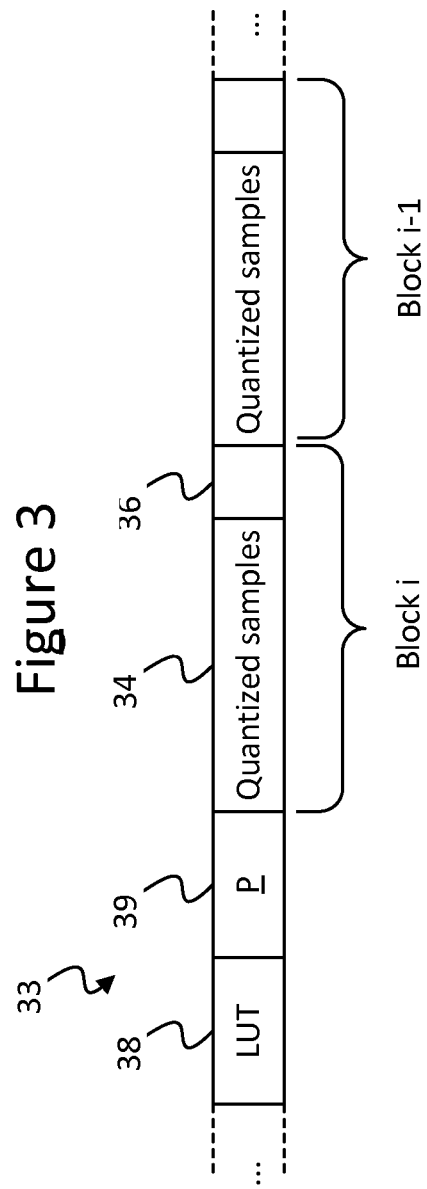
FIG. 3 is a schematic representation of an encoded video stream.

FIG. 3 gives a schematic representation of an encoded bitstream 33 as would be transmitted from the encoder running on the transmitting terminal 12 to the decoder running on the receiving terminal 22. The bitstream 33 comprises a plurality of quantized samples 34 for each block, quantized at least partially according to embodiments of the present invention as will be discussed in more detail below. In one application, the bitstream may be transmitted as part of a live (real-time) video phone call such as a VoIP call between the transmitting and receiving terminals 12, 22 (VoIP calls can also include video).

Figure 4:
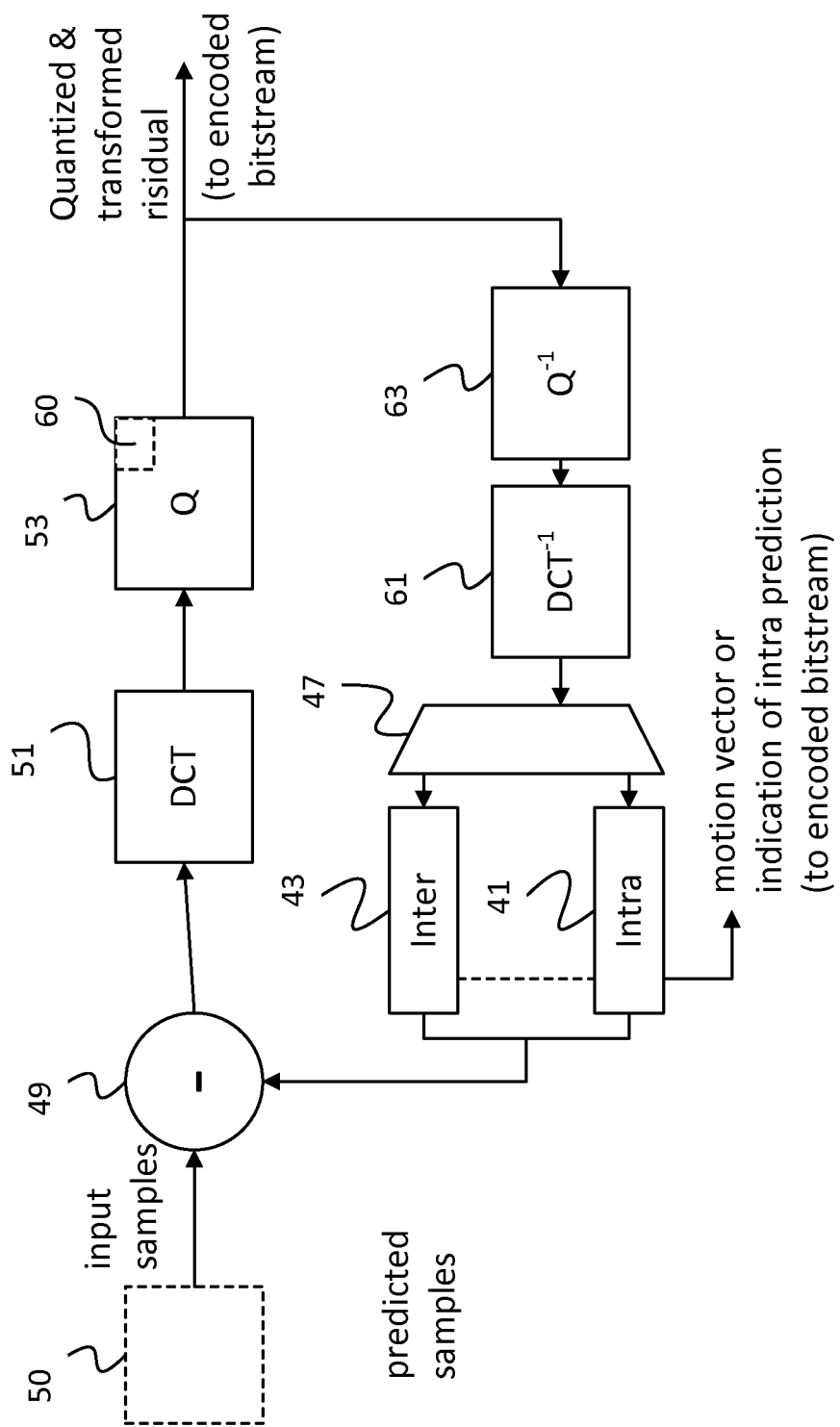
FIG. 4 is a schematic block diagram of an encoder.

FIG. 4 is a high-level block diagram schematically illustrating an encoder such as might be implemented on transmitting terminal 12. The encoder comprises: a discrete cosine transform (DCT) module 51, a quantizer 53, an inverse transform module 61, an inverse quantizer 63, an intra prediction module 41, an inter prediction module 43, a switch 47, and a subtraction stage (−) 49. The encoder may also comprise a pre-processing stage 50. Each of these modules or stages may be implemented as a portion of code stored on the transmitting terminal's storage medium 14 and arranged for execution on its processing apparatus 16, though the possibility of some or all of these being wholly or partially implemented in dedicated hardware circuitry is not excluded.

The subtraction stage 49 is arranged to receive an instance of the input video signal comprising a plurality of blocks (b) over a plurality of frames (F). The input video stream may be received straight from a camera 15 coupled to the input of the subtraction stage 49, or from a pre-processing stage 50 coupled between the camera 15 and the input of the subtraction stage 49. The intra or inter prediction generates a predicted version of a current (target) block to be encoded based on a prediction from another, already-encoded block or region. The predicted version is supplied to an input of the subtraction stage 49, where it is subtracted from the input signal (i.e. the actual signal) to produce a residual signal representing a difference between the predicted version of the block and the corresponding block in the actual input signal.

In intra prediction mode, the intra prediction 41 module generates a predicted version of the current (target) block to be encoded based on a prediction from another, already-encoded block in the same frame, offset by a motion vector predicted by the inter prediction module 43 (inter prediction may also be referred to as motion prediction). When performing intra frame encoding, the idea is to only encode and transmit a measure of how a portion of image data within a frame differs from another portion within that same frame. That portion can then be predicted at the decoder (given some absolute data to begin with), and so it is only necessary to transmit the difference between the prediction and the actual data rather than the actual data itself. The difference signal is typically smaller in magnitude, so takes fewer bits to encode.

In inter prediction mode, the inter prediction module 43 generates a predicted version of the current (target) block to be encoded based on a prediction from another, already-encoded region in a different frame than the current block. In this case, the inter prediction module 43 is switched into the feedback path by switch 47, in place of the intra frame prediction stage 41, and so a feedback loop is thus created between blocks of one frame and another in order to encode the inter frame relative to those of a preceding frame. This typically takes even fewer bits to encode than an intra frame.

The samples of the residual signal (comprising the residual blocks after the predictions are subtracted from the input signal) are output from the subtraction stage 49 through the transform (DCT) module 51 where their residual values are converted into the frequency domain, then to the quantizer 53 where the transformed values are converted to discrete quantization indices. The quantized, transformed indices 34 of the residual as generated by the transform and quantization modules 51, 53, as well as an indication of the prediction used in the prediction modules 41, 43 and any motion vectors 36 generated by the inter prediction module 43, are all output for inclusion in the encoded video stream 33 (see FIG. 3); typically via a further, lossless encoding stage such as an entropy encoder (not shown) where the prediction values and transformed, quantized indices may be further compressed using lossless encoding techniques known in the art.

An instance of the quantized, transformed signal is also fed back though the inverse quantizer 63 and inverse transform module 61 to generate a predicted version of the block (as would be seen at the decoder) for use by the selected prediction module 41 or 43 in predicting a subsequent block to be encoded. Similarly, the current target block being encoded is been predicted based on an inverse quantized and inverse transformed version of a previously encoded block. The switch 47 is arranged pass the output of the inverse quantizer 63 to the input of either the intra prediction module 41 or inter prediction module 43 as appropriate to the encoding used for the frame or block currently being encoded.

Figure 5:
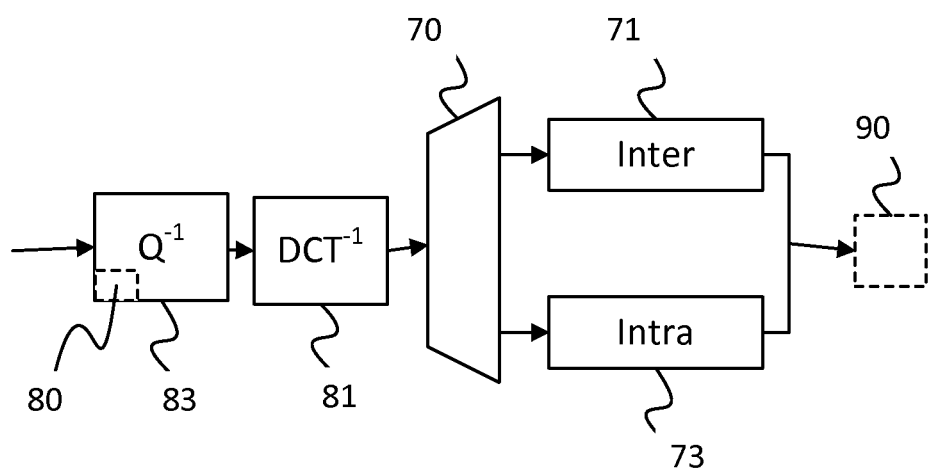
FIG. 5 is a schematic block diagram of a decoder.

FIG. 5 is a high-level block diagram schematically illustrating a decoder such as might be implemented on receiving terminal 22. The decoder comprises an inverse quantization stage 83, an inverse DCT transform stage 81, a switch 70, and an intra prediction stage 71 and a motion compensation stage 73. The decoder may also comprise a post-processing stage 90. Each of these modules or stages may be implemented as a portion of code stored on the receiving terminal's storage medium 24 and arranged for execution on its processing apparatus 26, though the possibility of some or all of these being wholly or partially implemented in dedicated hardware circuitry is not excluded.

The inverse quantizer 81 is arranged to receive the encoded signal 33 from the encoder, via the receiver 28. The inverse quantizer 81 converts the quantization indices in the encoded signal into de-quantized samples of the residual signal (comprising the blocks) and passes the de-quantized samples to the reverse DCT module 81 where they are transformed back from the frequency domain to the spatial domain. The switch 70 then passes the de-quantized, spatial domain residual samples to the intra or inter prediction module 71 or 73 as appropriate to the prediction mode used for the current frame or block being decoded, where intra or inter prediction respectively is used to decode the blocks (using the indication of the prediction and/or any motion vectors 36 received in the encoded bitstream 33 as appropriate). The decoded blocks may be output straight to the screen 25 at the receiving terminal 22, or to the screen 25 via a post-processing stage 90.

Embodiments of the present invention provide an improved method for quantization. In embodiments this may be implemented as an initial quantization stage in the pre-processing stage 50 prior to further quantization by the quantization module 53 of the decoder; or in other embodiments it may be implemented as a process or sub-module 60 integrated into the quantization 53 of the encoder itself. Similarly, further embodiments of the invention provide an improved method for de-quantization, which in some embodiments may be implemented in post-processing stage 90 after an initial stage of de-quantization by the inverse quantization module 83 of the decoder, or in other embodiments may be implemented as a process or sub-module 80 integrated into the inverse quantization 83 of the decoder itself.

As mentioned, quantization is the process of converting a signal represented on a more finely defined scale to a signal represented on a more coarsely defined scale, in this case from a higher color depth to a lower color depth. Note that in some systems there may be several stages of conversion of the color depth, which may be thought of a several stages of quantization and de-quantization. In this case, at the encoder side a quantization index output by one stage can form the input color value to be further quantized by a next stage, and at the decoder side a de-quantized color value from one stage can form the quantization index of a subsequent de-quantizer stage. Quantized does not necessarily mean maximally quantized, and de-quantized does not necessarily mean fully de-quantized. Quantization is matter of degree, and there may or may not be several different stages. Any quantized value can be quantized again, and a de-quantized value can itself represent a value for further de-quantization. Hence where it is said a signal, value or such like is quantized, this does not necessarily mean down to a scale with the lowest possible level of granularity, but could also refer to a reduction in granularity. Similarly, where it is said a quantized signal, value or such like is de-quantized, this does not necessarily mean up to a perfectly continuous scale or to a scale with the highest possible level of granularity, but could also mean back onto a scale of higher granularity (albeit with coarse steps remaining between the values the signal can take on that scale due to the quantization process).

The output of the DCT module 51 (or other suitable transformation) is a transformed residual signal comprising a plurality of transformed blocks for each frame.

The codec defines a form or structure for representing a set of frequency domain components for a block on each color channel. Multiple blocks in the same video stream will share the same form or structure. In any given instance of a block, each component of the form is instantiated by a respective coefficient for that component, representing the size (e.g. amplitude) of the contribution from that component in the particular block in question. That is, for each block in the image as viewed, in the digital representation of it there is a set of frequency domain components for each channel of the color space being used, e.g. a set of Y channel components, a set of U channel components and a set of V channel components; and in any actual instance of a block to be encoded, the block will then comprise a set of Y coefficients representing the size of the Y components for that particular block, a set of U coefficients representing the size of the U components of the particular block, and a set of V coefficients representing the size of the V components for that block. Generally the set of coefficients will be different for different blocks.

FIG. 6 schematically illustrates of an example set of frequency domain components of a particular channel of a color space for a given block.

Typically the frequency domain components comprise a DC component representing the average or overall value of U, U or V for the block, and a plurality of AC components representing the variations in these values at different spatial frequencies.

Each of the DC coefficient and the AC coefficients in each color channel of each block will then be quantized by the quantizer 53 at the encoder side, to be de-quantized back onto the original scale at the decoder side (albeit with coarse steps remaining between the actual possible values can take on that scale due to the quantization and de-quantization process).

In the example shown there are 8×8 coefficients, e.g. 8×8 luminance (Y) coefficients, representing a transformed version of an 8×8 block of pixels.

Note that although the luminance in itself is the measure of intensity, and alone only represents levels of grey from black to white, in the present context a luminance value may be considered a color value in the sense that it contributes to a color space representation of a colored image (e.g. without luminance it is not possible to represent dark blue and light blue). Luminance is a channel of YUV color space.

Figure 7:
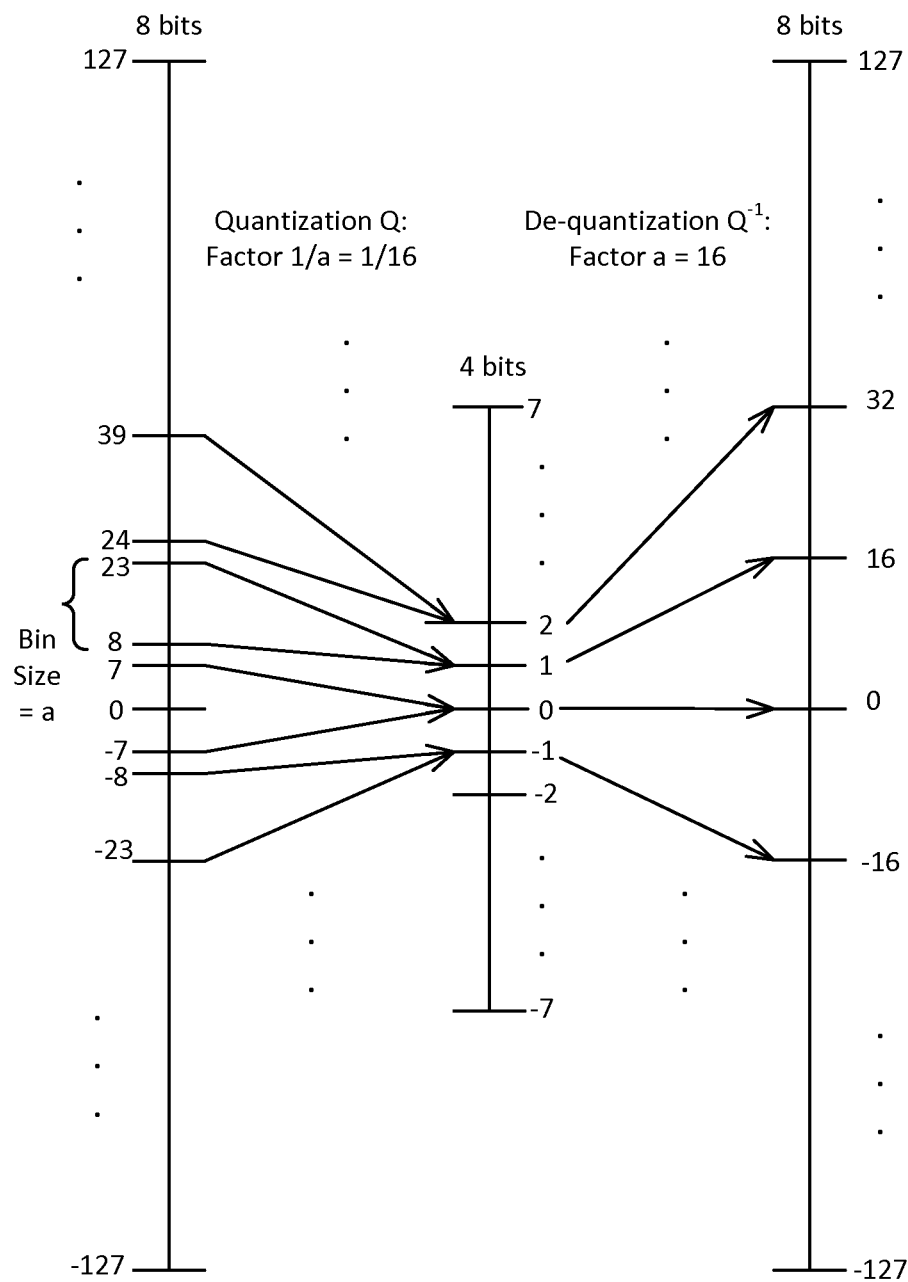
FIG. 7 is a schematic representation of a quantization scheme for quantizing a block.

As illustrated by way of example in FIG. 7, in a conventional quantizer, this is achieved by dividing each coefficient by a quantization factor (a) at the encoder side and rounding to the nearest integer, and then multiplying back up by that quantization factor (a) at the decoder side. For instance, on the left hand side of FIG. 7 is shown an 8-bit scale having 255 possible levels from −127 to +127 (with the 8-bits including a 1-bit flag to indicate positive or negative). If this is quantized down to a 4-bit scale, this means dividing down by a factor of 16 (a 4-bit scale is shown here for illustrative purposes, which is possible, but a more realistic example in certain circumstances may be quantizing down to a 5- or 6-bit scale). Hence in this example any value on the un-quantized scale having a magnitude falling between 0 and 7 will reduce to less than 0.5 when divided by the quantization factor a=16, and hence be quantized to zero on the quantized scale. Similarly, any value on the un-quantized scale having a magnitude between 8 and 23 will be between 0.5 and 1.5 when divided down by the factor a=16 and hence quantized to 1 on the quantized scale, any value on the un-quantized scale having a magnitude between 8 and 23 will be between 1.5 and 2.5 when divided down by the factor a=16 and hence quantized to 2 on the quantized scale, and so forth. At the decoder side, any values of 0 will still be zero on the de-quantized scale, any quantized values of 1 will be de-quantized to 1×16=16 on the de-quantized scale, any quantized values of 2 will be de-quantized to 2×32, and so forth.

Referring to FIG. 8, in some existing systems it is possible to provide the decoder side with a quantization matrix comprising a separate factor $a_{n,m}$ for quantizing and de-quantizing each frequency domain component ($k_y$, $k_x$) of the block format, where m and n are indices of the frequency components in the x and y directions respectively. The coefficients DC, $AC_{n,m}$ of each block are divided element-wise by the respective elements of quantization matrix, and then each is rounded to the nearest integer. Note that whilst different factors may be supplied for different frequency components, for a given frequency component ($k_y$, $k_x$) the same factor $a_{m,n}$ is used to scale the corresponding coefficient DC or $AC_{m,n}$ of the component for each of multiple blocks (there is not one matrix sent per block). So in the quantization at the encoder side, the DC coefficient of each of multiple blocks is divided by the fixed factor $a_{0,0}$, and the AC coefficient $AC_{0,1}$ of the first component ($k_0$, $k_1$) in the x direction in each of the multiple blocks is divided by $a_{0,1}$, etc. The matrix is also provided to the decoder size, so that the DC coefficient in each of the multiple blocks is multiplied back by $a_{0,0}$, the coefficient $AC_{0,1}$ of the first component in the x direction in each of the multiple blocks is multiple by $a_{0,1}$, etc.

However, this still only enables a fixed, linear scaling for any given component, i.e. with uniform steps.

In embodiments of the present invention, instead of a fixed factor for each component, there is provided for at least one of the components of the block format a look-up table mapping each possible level of the quantized scale to a different respective de-quantized level. The look-up table can be sent to the decoder side in the transmitted bitstream, in embodiments as an element 38 encoded into the encoded bitstream together with the encoded samples 34 and any prediction indicators or motion vectors 36 (e.g. concatenated with the rest of the encoded bitstream and encoded together by an entropy encoder stage, not shown). For example refer again to the schematic representation of FIG. 3. The bitstream including the look-up table may be transmitted from the encoder running on transmitting apparatus 12 to the decoder running on the receiving apparatus 22, via the transmitter 18 and receiver 28, e.g. over a packet-based network such as a wide area internetwork like the Internet, or over a packet-based mobile cellular network like a 3GPP network. At the decoder side, the look-up table can then be used to de-quantize the coefficients of the relevant component in each of multiple blocks. In embodiment this quantization technique is used to quantize and de-quantize the coefficients of the DC component.

An example is illustrated schematically in FIG. 9. Here the more conventional scaling factors $a_{n,m}$ could optionally still be sent for each of the AC components, but for the DC component a look-up table (LUT) is sent from to the decoder. The look up table maps de-quantized levels L to quantization indices (i.e. quantized levels) by specifying a respective, arbitrarily-definable de-quantized level in the table against each possible quantization index. E.g. in the example of values on an 8-bit scale being quantized to a 4-bit scale, if for instance the quantization index can take any value from −7 to +7 (the 4 bits including a 1-bit flag for positive or negative) then the look-up table will comprise fifteen arbitrarily definable levels $L_0 \ldots L_{15}$ on the un-quantized and de-quantized scale mapped to the seven quantization indices respectively. Again a quantized scale of 5 or 6 bits may be more likely in certain situations, but 4-bits is shown here for illustrative purposes and is not ruled out as a possible implementation.

Figure 10:
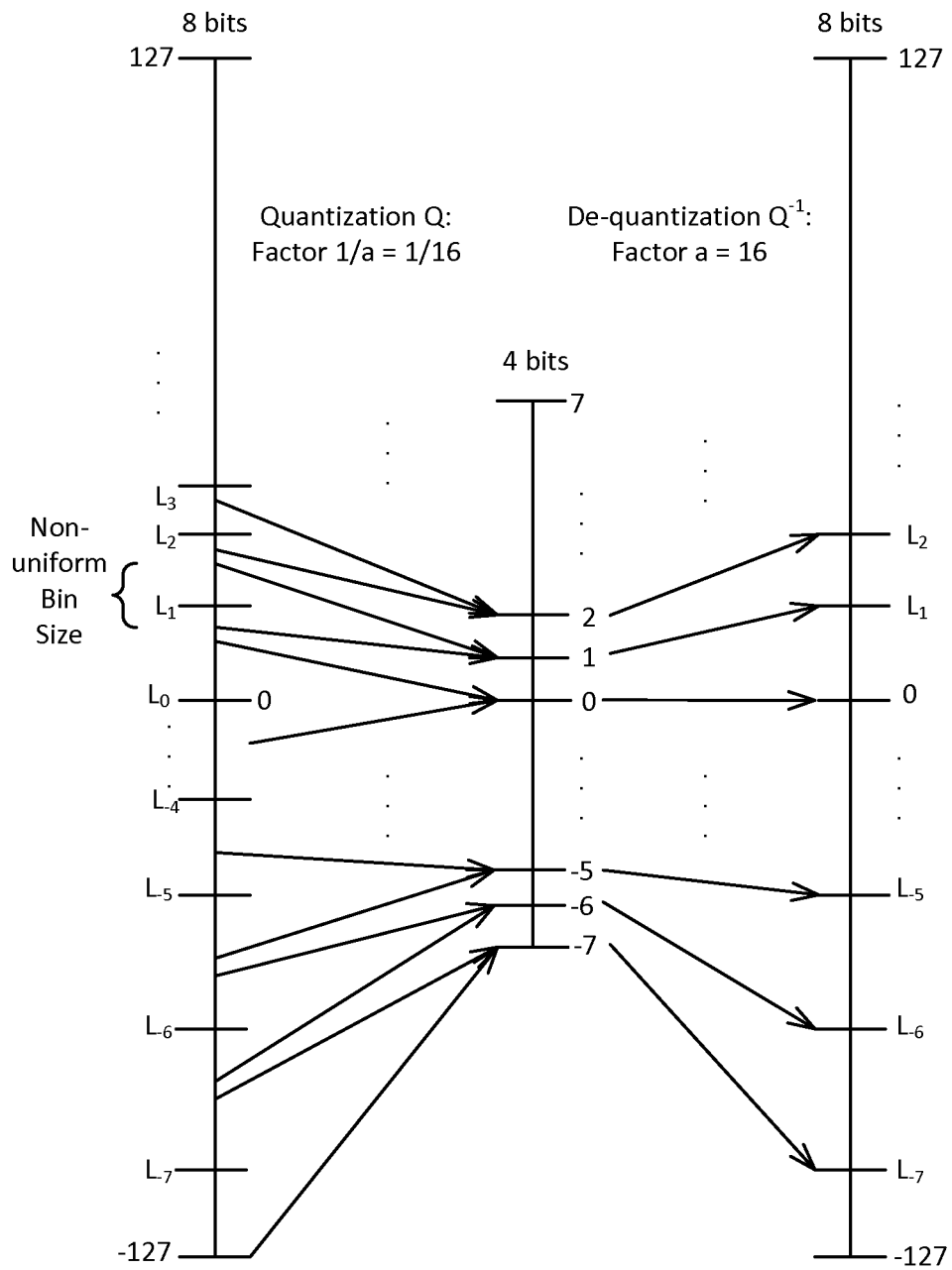
FIG. 10 is another schematic representation of a quantization scheme for quantizing a block.

FIG. 10 gives a schematic illustration of the quantization levels for one example of a particular component of a particular channel in accordance with embodiments of the present invention, e.g. the DC component of the Y channel. As shown, at the encoder side, the quantizer may be configured to determine which of the de-quantized levels L of the look-up table a value to be quantized (e.g. a DC coefficient of a particular block) falls closest to on the un-quantized scale. An example of this is shown on the left hand side of FIG. 10. The quantizer then converts the un-quantized value to the respective corresponding quantization index (quantized value) mapped to that level by the look-up table. This is done for the coefficient of the relevant component or component (e.g. the DC coefficient) for each of multiple blocks. This process may be implemented in a sub-module 60 incorporated within the quantized 53 of the decoder. The quantized indices 34 are then sent to be included in the encoded bitstream, and are also fed round to the inter or intra prediction coding modules 41 or 43 via inverse stages 61 and 63 to generate any required indication of the prediction and any required motion vectors 36, also for inclusion in the bitstream. These elements 34, 36 are included in the bitstream together with an instance of the look-up table LUT 38, in embodiments encoded together into the same encoded bitstream via a further, lossless encoding stage such as an entropy encoder.

An alternative is for the quantization to be applied prior to encoding in the pre-processing stage 50.

At the decoder side, the de-quantizer 83, 80 or 90 uses the look-up table received from the encoder side to convert the received indices for a given component (e.g. the DC coefficients in multiple blocks) to de-quantized levels L on the de-quantized scale as mapped to the possible values of those indices by the-look-up table. This process could be implemented in a sub-module 80 incorporated within the de-quantizer 83 in the decoder, or in a post-processing stage 90.

The quantization levels L in the look up table can be set at any level desired by the system designer. Therefore the look-up table means that the quantization is not limited to uniform spacing between levels, but can instead be used to define any distribution, and so this allows greater flexibility in defining a quantization distribution in order to allocate more finely spaced regions of the scale that will have more significance for a given component of a channel, and more coarsely spaced levels in regions of the scale that will have less significance.

An equivalent way of mapping quantized levels to de-quanatized levels is for the look up table to specify the boundaries between bins. In this case, at the encoder side the quantizes determines which two bin boundaries on the un-quantized scale the value to be quantized falls between, and converts the value to a quantization index mapped to the respective bin by the look-up table. At the decoder side the de-quantized levels mapped by the look-up table are then found by interpolating between the bin-boundaries (e.g. taking the mid value between them).

Note that the same look-up table is used to quantize and de-quantize the coefficient for the same component in each of multiple blocks (there is not one new look-up table sent per block). In embodiments, the look-up table is used to quantize and de-quantize the coefficient of the DC component in each of multiple blocks.

Note also, it is usually desirable to have a significantly sized bin that quantizes to zero, because in the frequency domain many perceptually insignificant components will quantized to zero and the block will only have very few non-zero components. This requires fewer bits to encode and hence is more efficient in terms of bitrate for a certain perceived quality. In some possible ways of implementing the look-up table, the zero level could be implicit rather than being specified explicitly in the look-up table (i.e. both the quantizer and de-quantizer would assume that a quantization index of zero maps to a de-quantized level of zero).

According to certain embodiments of the present invention, at the encoder side the look-up table is determined based on an indication of the screen (e.g. screen 25) through which the decoded video will be viewed. The indication may be sent from the receiving terminal 22 to the transmitting terminal 12, e.g. via the packet-based network 32. For example see feedback signal 35 indicated in FIG. 3. Alternatively the indication could be provided to the encoder side in another manner, e.g. entered manually by a user.

In this way, the look-up table can be adapted to the screen of the decoder. This may be used to adapt the decoder to the quantization level distribution which the manufacturer has tuned their particular screen to. By doing this for a given bit budget in the encoded bitstream, more bits (a greater color depth) can be spent in regions of the spectrum in which a particular screen has been tuned to be more sensitive to, whilst fewer bits (a lower color depth) need be spent in regions of the spectrum which a particular manufacturer's screen has been tuned to be less sensitive to (and therefore where too high a color depth in the encoded signal would be wasted).

In embodiments, the indication of the screen fed back from the receiving terminal 22 may be an identifier of a particular type or model of screen such as a serial number of the model. Note the serial number or identifier of the screen is not necessarily the same as the serial number or identifier of the set or unit in which the screen is housed. Often different manufacturers of user equipment units like TV sets and mobile phones may source the actual display screen component of the unit from the same manufacturer of LED or LCD screens for example. It is typically the screen as manufactured rather than the unit in which it is housed that is the relevant factor (though it is not ruled out that different manufacturer of different units rather than screens will tune their screens differently).

The quantizer 53, 60 or 50 at the encoder side may determine the look-up table by selecting it from amongst a collection of predetermined tables. For example there may be provided a different look-up table for each possible screen identifier or group of screen identifiers (e.g. for each possible serial number or group of serial numbers), and the quantizer may be configured to select the look-up table appropriate to the identifier indicated from the receiving apparatus 22.

In embodiments, the quantizer 53, 60 or 50 is configured to be operable in at least two different modes. In the first mode of operation the quantization is performed using the look-up table technique discussed above, based on the indication of the decoder-side screen 25. In the second mode of operation, the quantization is instead performed based on a measure of human perception sensitivity to different frequency domain components.

Human vision is typically sensitive to different frequency domain components to different degrees. This information can be determined empirically and quantified by displaying small changes to a group of human volunteers and measuring the "just noticeable difference" (JND metric) for the different components of the each channel of a color space. This gives information concerning the different size steps in intensity which a human is able to detect for the different frequency components. Such information may be referred to as a perceptual model, and can be pre-stored at the encoder and decoder for use in quantization and de-quantization. Thus in the second mode, the quantization is performed so that frequency domain components that a human is more sensitive to are quantized with a higher color depth (on a quantized scale using more bits, with more possible quantization levels) whilst frequency domain components that a human is less sensitive to are quantized with a lower color depth (on a quantized scale using fewer bits, with fewer possible quantization levels). The spacing of the quantization levels or step for a given frequency domain component also need not be uniformly spaced, and this information can also be tested and quantified empirically as part of the perceptual model. The factors or levels used in such quantization can be determined from the pre-stored, empirically derived perceptual model.

In embodiments, an indication of the mode may be sent from the transmitting apparatus 12 to the receiving apparatus 22 so that the de-quantizer knows which corresponding de-quantization mode to use. In the second mode, either there is only one perceptual model which is assumed to be used at both the encoder end decoder side, or otherwise a further indication can be sent from the encoder to reference one of a small group of possible perceptual models pre-stored at the decoder side for use in the de-quantization.

The mode may be selected in dependence on whether the nature of the screen or the innate capacity of the human perceptual system is likely to be the limiting factor on what color depth is worth encoding.

This can be done by running both quantization models (i.e. the screen-based quantization of the first mode and the perceptual-model based quantization of the second mode) for one or more of the blocks at the encoder side, then applying a suitable metric of perceived distortion to each of the one or more blocks and comparing the results achieved by the two approaches. A metric quantifying perceived distortion typically measures a difference between the quantized and de-quantized block and the original block (or conversely the similarity). Whichever results in the best trade-off between bitrate and distortion will be selected for the actual quantization of the blocks. The test may be done on all blocks or macroblocks to select the respective mode for each block or macroblock, or the results obtained for one or some blocks or macroblocks could be used to select the quantization mode for a greater number of blocks. The exact weighting between bitrate and distortion will be a matter for design choice (depending on what bitrate and distortion a particular system designer is prepared to tolerate). For example one may define a trade-off measure which penalises both bitrate and distortion, optionally with a relative weighting W, e.g. similarity−Wx(bits incurred), or similarity/(bits incurred), and see which fares best under the two modes. The form of this relationship and any weighting factors are a matter of design choice depending on the system in question, and may be determined for example by trialing different simulations. Certain other caveats may also be introduced, such that the bits needed may not be allowed to go above a certain bit budget, and/or the distortion may not be allowed to go above a certain worst case.

An example metric for quantitatively measuring perceived distortion is the DVQ (digital video quality) metric.

Other suitable metrics for quantifying perceived distortion are also known to a person skilled in the art. For instance, another example is the Structural Similarity Index Metric (SSIM) which measures covariance of the quantized and de-quantized block with the original block. Simpler metrics include the root mean squared error (RMSE) between the quantized and de-quantized block and the original block, the mean absolute difference between the quantized and de-quantized block and the original block, and the peak signal to noise ratio (PSNR) between the quantized and de-quantized block and the original block.

Another example metric is based on a combination of a Watson's DVQ type approach and SSIM.

As an alternative, the mode may be selected manually. For example, a user of the transmitting terminal 12 could set a user setting specifying one mode or the other (e.g. because they find one is faster to process or incurs less uplink bandwidth), or a user of the receiving terminal 22 could set a user setting which is communicated back to the transmitting terminal 12 (e.g. because the viewing user at the receiving terminal 22 perceives one mode or the other to give less distortion).

According to any of the above-described embodiments, the quantization scheme based on a transmitted look-up table allows practically any distribution of quantization levels to be defined for a given component or components of a block.

In some systems however it may not be practical or desirable to send a look-up table for every component, as this would incur a relatively high bitrate overhead. On the other hand, simply using the fixed scaling factors of a quantization matrix a may be overly restrictive.

According to further embodiments of the invention, for at least one of the components of the block format there is provided one or more characteristic points in a quantization level distribution. This may be provided for one, some or all of the AC components. A different distribution could be sent of each AC component quantized in this manner, or in other embodiments some or all of the AC components could share a common quantization distribution.

An example is illustrated schematically in FIG. 11. Here, for each of multiple AC components $AC_{n,m}$ there is provided a respective set $\underline{P}_{n,m}$ of one or more characteristic points $\underline{p}_{n,m}^{0}$ to $\underline{p}_{n,m}^{I-1}$ where/is the number of points in the respective set, which is at least one but fewer than the number of quantization levels (i.e. the number of quantized levels or quantization indices on the quantized scale, which is also the same as the number of quantization bins on the un-quantized scale and the number of possible de-quantized levels a value can take on the de-quantized scale). The characteristic points of a given set $\underline{P}_{n,m}$ are used at the decoder side to reconstruct a quantization level distribution for de-quantizing received values of the respective corresponding component $AC_{n,m}$ over a plurality of blocks, e.g. by fitting a distribution to the received points or interpolating between the points.

Figure 12:
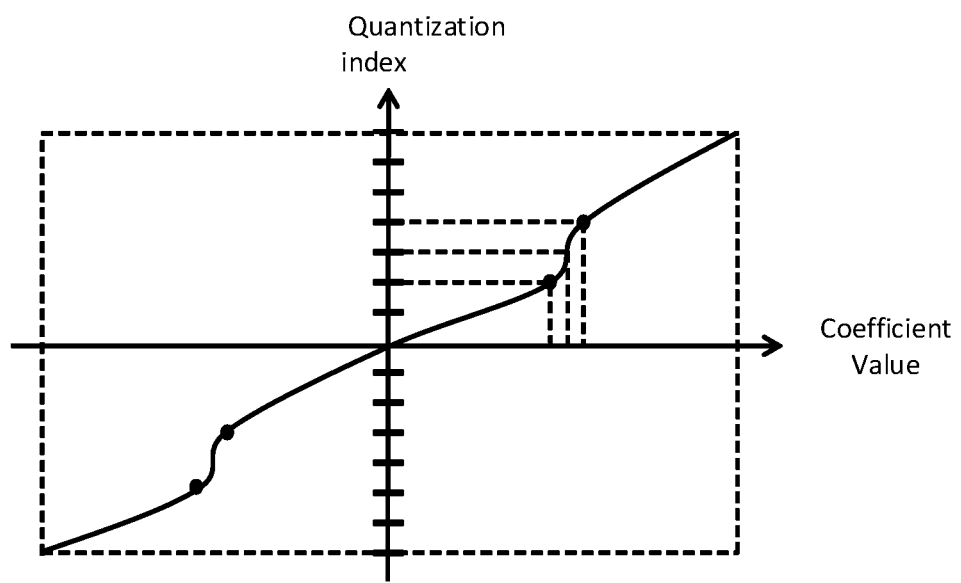
FIG. 12 is a schematic representation of a quantization level distribution.

FIG. 12 gives a schematic illustration of a reconstructed quantization level distribution for one example of a particular component of a particular channel in accordance with embodiments of the present invention, e.g. an AC component of the Y channel.

At the encoder side, the quantizer 53, 60 or 50 determines a quantization level distribution for quantizing the coefficients of a particular frequency domain component. That is, for each fixed size of step in the quantized value on the quantized scale (e.g. adjacent quantization indices), the distribution defines a respective size of step on the un-quantized and de-quantized scale, where the steps on the un-quantized and de-quantized scale are not necessarily uniform and at least some of them may be different from one another. This means certain regions of the un-quantized and de-quantized scale will have finer steps for a given step in the quantized value, while other regions will have coarser steps.

For example, the distribution may approximate a cubic equation, a quadratic equation or polynomial, e.g. with at least a term of power 5. The steps in the middle range of magnitude may be more finely defined, i.e. so the quantization levels are coarse around zero and at the extremes of magnitude. If the quantization index (the quantized value) can define positive and negative values, a quadratic equation with a term raised to the power of 5 may be used to model this. E.g. this could look something like FIG. 12 (though FIG. 12 is only schematic). If the quantization index can define only magnitude, the distribution could be modelled as a cubic equation. However, other models are possible as appropriate to system design, e.g. a logarithmic form.

Based on the distribution, the quantizer 53, 60 or 50 determines a set P of one or more characteristic points p, shown as dots in FIG. 12. For example the characteristic points may be inflection points of the distribution (though alternative or additional points could also be used). For each component or group of components to be quantized according to this scheme, the quantizer 53, 60 or 50 then sends these to the decoder side as an element 39 in the transmitted bitstream (refer again to FIG. 3) for use in the de-quantization of that component or components. The sets of points may be encoded into the encoded bitstream together with the quantized samples 34 and any indication of the prediction used and/or motion vectors 36 via a further, lossless encoding stage such as an entropy encoder (not shown).

At the decoder side, the de-quantizer 83, 80 or 90 uses the received points to reconstruct the quantization level distribution and thus de-quantize the coefficients of the respective component or components according to the reconstructed distribution. This reconstruction could be done by fitting a quadratic, e.g. as shown schematically in FIG. 12. In the case of a quadratic or polynomial fit, in embodiments this may be done for example as a smooth fit or a piecewise fit. A piecewise fit uses different quadratic first for different segments of the curve, e.g. a different fit between each pair of points.

Figure 13:
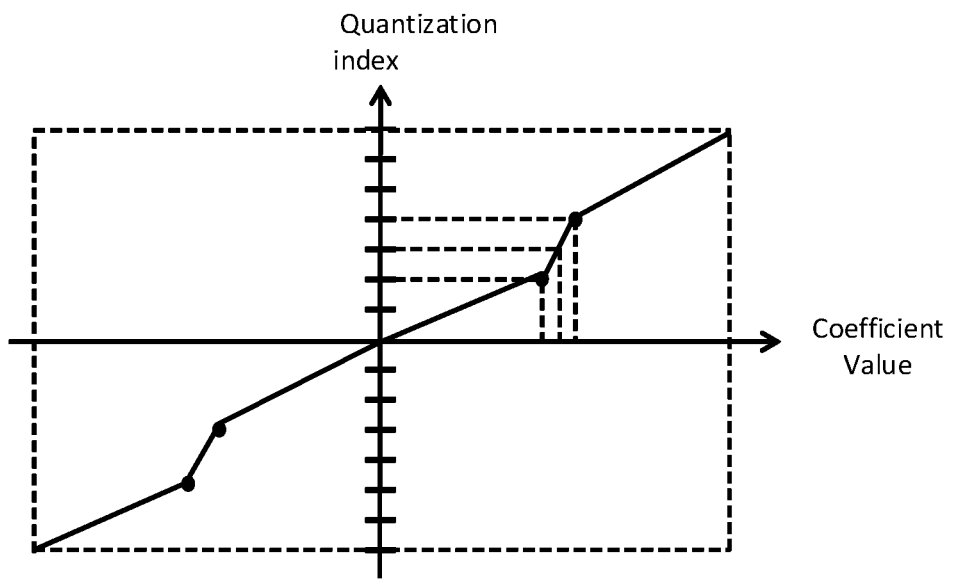
FIG. 13 is another schematic representation of a quantization level distribution.

FIG. 13 shows an alternative where straight-line interpolation between the points is used to reconstruct the distribution, rather than fitting a quadratic or other smooth form of distribution.

Note that in embodiments, for a given frequency component ($k_y$, $k_x$) the same set $\underline{P}_{n,m}$ of characteristic points representing the same distribution is used to quantize and de-quantize the coefficient $AC_{m,n}$ of that component for each of multiple blocks (there is not one set of points representing a new distribution sent for every block). The same set of characteristic points could also be used for multiple different components of a block, or each component could be allocated its own distribution. Some components may be quantized by other means, e.g. the look-up table or fixed scaling factor.

Note also that zero could be an implicit point used in reconstructing the distribution, in addition to the. The highest point on the scale could also be an implicit point, and/or a negative lowest point could be implicit. This may help reduce the number of points that need to be sent from the encoder side. Further, although generally the negative side of the distribution need not be symmetrical with the positive side, it will often tend to be at least similar and so to reduce the number of points that need to be sent then in embodiments the de-quantizer may be configured to mirror the negative side from the positive side, or vice versa. Again this saves on the number of points that need to be sent from the encoder sider to the decoder side, and so saves on bitrate.

Figure 14:
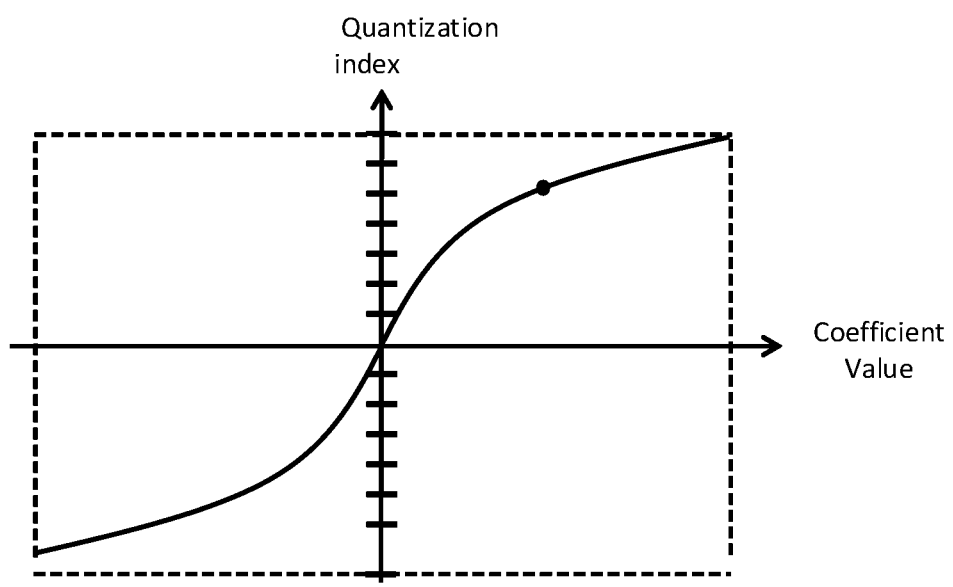
FIG. 14 is another schematic representation of a quantization level distribution.
Figure 15:
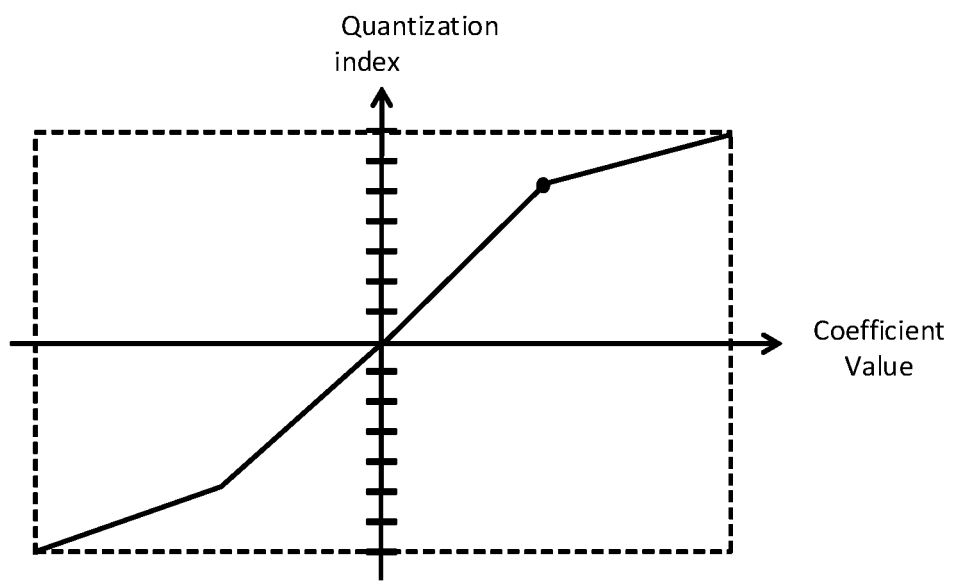
FIG. 15 is another schematic representation of a quantization level distribution.

Examples of such options are illustrated in FIGS. 14 and 15, which use only one explicit point sent from the encoder to the decoder side. In this example, the fact that a quantization index (quantized value) of zero corresponds to a de-quantized level of zero is assumed to be implicit by both the quantizer at the encoder side and the de-quantizer at the decoder side, and hence this gives one extra, implicit point. Further, the fact that the highest quantization index corresponds to a certain predetermined highest de-quantized level, and the fact that the lowest negative quantization index corresponds to a certain predetermined lowest de-quantized negative level, are assumed implicit by both the quantizer at the encoder side and the de-quantizer at the decoder side, giving two more implicit points. Also, the explicit point from the positive quadrant can be mirrored into the negative quadrant, given one more point. A distribution can then be fitted (FIG. 14) or interpolated (FIG. 15) from the set of explicit and implicit points. However, there will be at least one explicit point according to such embodiments of the invention. A different shape of fitted curve is also shown in FIG. 14 for illustration, e.g. a mirrored logarithmic distribution, in contrast with the quadratic distribution of FIG. 12.

Similar to the scheme specifying a distribution by means of a look-up table as discussed above, the scheme characterising a quantization distribution by means of a smaller set of points may be adapted based on an indication of the screen 25 through which the video will be viewed at the receive side. Analogous teachings may apply: the indication may be received from the receiving apparatus 22, or input by a user; the distribution selected (and the corresponding characteristic points used to represent it) may be pre-stored at the encoder side and decoder side for use by the quantizer and de-quantizer respectively, and the quantizer may select from amongst a small group of predetermined distributions based on the indication; and this may be used to adapt the distribution to the tuning of a particular manufacturer's model of screen or group of screen models.

The above-described scheme based on (i) a look-up table specifying a distribution and (ii) a set of characteristic points for reconstructing a distribution, could be used individually or in combination. In embodiments, the full look-up table is used to quantize and de-quantize the DC component, while the smaller sets of characteristic points of one or more quantization level distributions are used to quantize and de-quantize a plurality of the AC coefficients, with the LUT 38 and characteristic points 39 all being transmitted from the encoder to the decoder in the transmitted bitstream, in embodiments encoded into the bitstream together with the other elements 34, 36 by an entropy encoder or such like.

Further, the distributions to be reconstructed from characteristic points can also be used in the first mode of operation described above, where the quantizer selects between the first mode and a second mode in which the quantization is performed instead based on a model of human perception. The first mode could use either or both of the schemes based on (i) a look-up table specifying a distribution for at least one of the frequency domain components, and/or (ii) a set of characteristic points for reconstructing a distribution for one or more of the frequency domain components, either individually or in combination. For example, in embodiments the first mode uses the full look-up table for the DC component while the smaller sets of characteristic points are used for the AC components. In embodiments, the mode can be selected in the same way described above, but including the effect of de-quantizing based on a reconstructed distribution when determining the metric of perceived distortion (measuring the difference between the quantized and de-quantized block and the original block, or conversely the similarity). Alternatively the mode can be selected manually, e.g. by a user setting, again as discussed above.

Various embodiments can be utilized in a layered coding technique for multicasting, among other scenarios.

Figure 16:
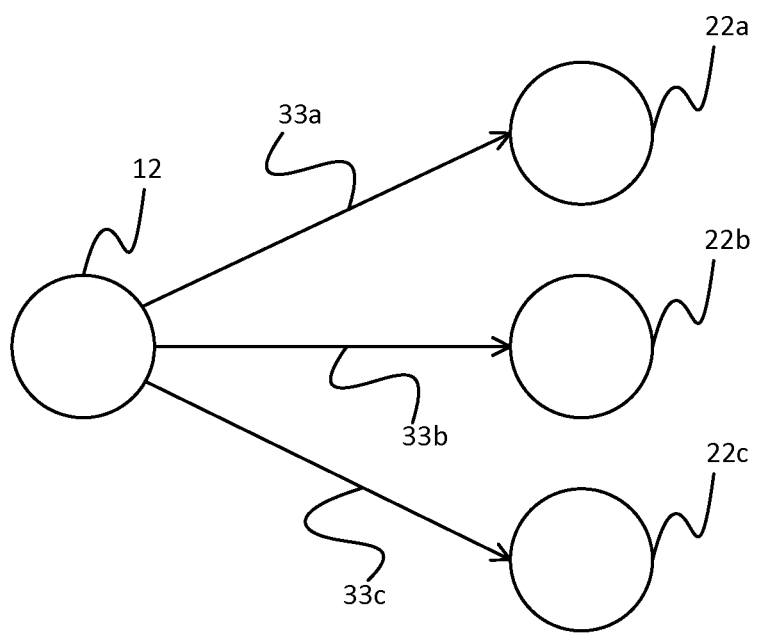
FIG. 16 is a schematic representation of a multi-party communication scenario.

FIG. 16 gives a high-level schematic representation of a transmitting terminal 12 (transmitting node) transmitting a different instance 33a, 33b, 33c of a video bitstream to each of a plurality of receiving terminals 22a, 22b and 22c (receiving nodes) respectively. The instances of the stream sent to each recipient node 22a . . . 22c comprises the same user content, e.g. video call from the same webcam, or same film, program, music video, video diary or such like, but at least one of the different instances is encoded as a lower bitrate version of the stream whilst at least one other of the different instances is encoded as a higher bitrate instance of the stream. For example, say the first stream 33a from the transmitting node 12 to the first recipient node 22a is a low bitrate instance of the stream, the second stream 33b from the transmitting node 12 to the second recipient node 22b is a higher bitrate instance of the stream, and the third stream 33c from the transmitting node 12 to the third recipient node 22c is another higher bitrate instance of the stream.

This can be achieved by generating at the encoder on the transmitting node 12, a base layer of the encoded video bitstream which forms the low bitrate stream and which is sent to all recipients, e.g. to nodes 22a, 22b and 2c; and one or more additional layers of encoding which can be sent independently to different recipients, e.g. to nodes 22b and/or 22c. A receiver 22b or 22c receiving both layers is thus able to recreate the video image with less distortion, but at the expense of higher bitrate on the receiver's downlink and processing resources. A receiver 22a receiving only the base layer on the other hand, will only be able to recreate a version of the video image having more distortion, but will incur less burden on that receiver's downlink and processing resources. The basic idea behind layered coding will be familiar to a person skilled in the art.

In one application of the present invention, the base layer could be created by a more conventional linear quantization scheme with uniform quantization steps, with a low color depth, e.g. quantizing down to 5 bits per channel. The encoder may then determine a second level of residual signal representing the different between the original signal and the encoded and decoded base layer. This second layer of residual signal can then be encoding using one or more of the non-uniform quantization schemes according to embodiments of the present invention as described above, with a relatively high color depth such as 6 or 7 bits per channel. The encoded base layer can be sent to one recipient, e.g. node 22a, while the base layer and the second layer encoded residual is sent to another recipient, e.g. node 22b.

Alternatively, the base layer could be created by one or more of the quantization schemes according to embodiments of the present invention, but with a relatively low color depth such as 5 or 6 bits per channel. The second layer of residual may then be encoded with a more conventional fixed or uniform quantization scheme, but with a higher color depth, e.g. 8 bits per channel. In another alternative, the base layer could be a uniform quantization based on a low color depth, e.g. 5 bits per channel; while a second layer of residual is encoded based on a scheme according to embodiments of the present invention with a medium color depth, e.g. 6 or 7 bits per channel, and a third layer residual could be encoded with a uniform but higher color depth quantization such as 8 bits per channel. In another alternative, the quantization scheme according to embodiments of the present invention could be used to encode two or different layers of the layered coding, but using different color depths for the different layers, and different distributions for the different layers. Note that in embodiments, a layer encoded using a scheme according to embodiments of the present invention need not have the same color depth per channel, e.g. it could use 6 bits to represent a component on the Y channel but only 5 bits to represent each component on the U and V channels; or similarly in RGB space.

In embodiments, the layer sent to a particular recipient may be made dependent on an indication of the screen 25 of the recipient, e.g. the same indication 35 received from a receiving terminal 22 along the lines discussed above. For example only the base layer or only lower layers of the layered coding may be sent to one or more recipients 22a having a low color depth screen 25 who would not benefit from a higher encoded depth, whilst one or more higher layers may additionally be sent to one or more recipients 22b and/or 22c having a higher color depth screen 25 who will benefit from the higher depth. The selection of which layers to send may also be dependent on other factors, such as the downlink bandwidth and/or processing resources of the recipient 22.

However, the various embodiments are by no means limited to an application in layered coding, and also finds application in a non-layered, single stream to a single recipient, or non-layered streams to multiple recipients, encoding the residual just between the original and inter or intra predicted blocks along the lines discussed earlier in relation to FIGS. 4 and 5.

It will be appreciated that the above embodiments have been described only by way of example. For instance the various embodiments can be implemented in any color space, whether RGB, YUV or otherwise. It can be used to convert from any higher-color depth top any lower color depth, and any number of different quantization stages may be present. Further, as explained, the various embodiments can be implemented as an intrinsic part of an encoder or decoder, e.g. incorporated as an update to an H.264 or H.265 standard, or as a pre-processing and post-processing stage, e.g. as an add-on to an H.264 or H.265 standard. Further, while the above has been describe in terms a look-up table to represent the quantization of the DC component of blocks and a set of characteristic points of a distribution to represent the quantization of AC components of blocks, either of these techniques could be used for quantizing and de-quantizing any one or more components of a block or blocks. Indeed, the various embodiments are not restricted specifically to a representation based on a DC coefficient and a plurality of AC components, nor to a DCT transform nor even to quantizing components of a spatial frequency domain transform, but in other applications could be used in the spatial domain prior to a transform or for encoding without transformation, or could be applied in a different transform domain such as a Karhunen-LoeveTransform (KLT) transform or temporal frequency domain transform. Further, the various embodiments are not limited to VoIP communications or communications over any particular kind of network, but could be used in any network capable of communicating digital data, or in a system for storing encoded data on a storage medium.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A transmitting apparatus comprising:
   an input configured to receive a video signal from a video camera;
   an encoder configured to generate a bitstream from said video signal, the bitstream comprising a plurality of encoded image portions having a common form representing a plurality of components of a channel in a color space, wherein each of a plurality of the encoded image portions comprises a different set of quantized values of the plurality of components;
   a quantizer configured to generate the quantized values; and
   a transmitter configured to transmit the encoded bitstream to a decoder of a receiving apparatus;
   the quantizer being further configured to:
     receive an indication concerning a screen type of the receiving apparatus, and based on said indication to select a look-up table mapping the quantized levels to at least partially de-quantized respective levels;
     selectively operate in at least two modes of operation: a first mode of operation in which the quantizer generates the quantized values in accordance with the look-up table determined based on the indication concerning the screen type of the receiver; and a second mode of operation in which the quantized values are generated according to a quantization level distribution related to a measure of human sensitivity to the components in the image portions; and
     switch between said first and second modes of operation in dependence on a determination as to whether the human sensitivity to the components or the screen of the receiving apparatus is considered a more limiting factor; and
   the transmitting apparatus is configured to insert the look-up table into the bitstream for use at the receiving apparatus in at least partially de-quantizing the different quantized values of the first component for a plurality of the image portions, the look-up table being usable to adapt the decoder to a quantization level distribution that is specific for the screen type.

2. The transmitting apparatus of claim 1, wherein said components comprise components of a spatial frequency domain representation.

3. The transmitting apparatus of claim 1, wherein the quantizer is configured to receive the indication concerning the screen type in a signal from the decoder.

4. The transmitting apparatus of claim 1, wherein each of the encoded image portions represents a plurality of pixels transformed into a spatial frequency domain and/or temporal frequency domain representation comprising color values in the form of a plurality of spatial and/or temporal frequency domain coefficients, wherein in the second mode of operation the quantization level distribution is related to a measure of human sensitivity to said property at different spatial and/or temporal frequencies.

5. The transmitting apparatus of claim 1, wherein the determination as to whether the human sensitivity to the components or the screen of the receiving apparatus is the more limiting factor includes comparing the quantized values generated according to the first mode with the quantized values generated according to the second mode.

6. A computer program product comprising code embodied on a computer-readable storage device and configured so as when executed on a processing apparatus to perform operations comprising:
   selectively operating in at least two modes of operation including a first mode of operation in which generating quantized values is in accordance with a look-up table selected based on an indication concerning a screen type of a receiving apparatus, the look-up table mapping the quantized levels to at least partially de-quantized respective levels, and a second mode of operation in which generating quantized values is in accordance with a quantization level distribution related to a measure of human sensitivity to the components in image portions of a video signal;
   selecting one of said first mode or said second mode of operation in dependence on a determination as to whether the human sensitivity to the components or the screen of the receiving apparatus is considered a more limiting factor for a particular video signal;
   generating quantized values for the video signal using the selected mode of operation; and
   generating an encoded bitstream including a plurality of encoded image portions representing a plurality of components of a channel in a color space, each of a plurality of the encoded image portions comprising a different set of the quantized values.

7. The computer program product of claim 6, wherein said components comprise components of a spatial frequency domain representation.

8. The computer program product of claim 6, the operations further comprising receiving the indication concerning the screen type in a signal from a decoder of the receiving apparatus.

9. The computer program product of claim 6, wherein each of the encoded image portions represents a plurality of pixels transformed into one or more of a spatial frequency domain or a temporal frequency domain representation comprising color values in the form of a plurality of spatial and/or temporal frequency domain coefficients, wherein in the second mode of operation the quantization level distribution is related to a measure of human sensitivity to said property at one or more of different spatial frequencies or temporal frequencies.

10. The computer program product of claim 6, the operations further comprising adapting the look-up table using the indication concerning the screen type.

11. The computer program product of claim 6, the operations further comprising transmitting the encoded bitstream to the receiving apparatus over a packet-based network.

12. The computer program product of claim 6, the operations further comprising transmitting the encoded bitstream to the receiving apparatus as part of a live video call.

13. A method comprising:
   selectively operating in at least two modes of operation including a first mode of operation in which generating quantized values is in accordance with a look-up table selected based on an indication concerning a screen type of a receiving apparatus, the look-up table mapping the quantized levels to at least partially de-quantized respective levels, and a second mode of operation in which generating quantized values is in accordance with a quantization level distribution related to a measure of human sensitivity to the components in image portions of a video signal;

selecting one of said first mode or said second mode of operation in dependence on a determination as to whether the human sensitivity to the components or the screen of the receiving apparatus is considered a more limiting factor for a particular video signal;

generating quantized values for the video signal using the selected mode of operation; and generating an encoded bitstream including a plurality of encoded image portions representing a plurality of components of a channel in a color space, each of a plurality of the encoded image portions comprising a different set of the quantized values.

14. The method of claim 13, wherein said components comprise components of a spatial frequency domain representation.

15. The method of claim 13, further comprising receiving the indication concerning the screen type in a signal from a decoder of the receiving apparatus.

16. The method of claim 13, wherein each of the encoded image portions represents a plurality of pixels transformed into one or more of a spatial frequency domain or a temporal frequency domain representation comprising color values in the form of a plurality of spatial and/or temporal frequency domain coefficients, wherein in the second mode of operation the quantization level distribution is related to a measure of human sensitivity to said property at one or more of different spatial frequencies or temporal frequencies.

17. The method of claim 13, further comprising adapting the look-up table using the indication concerning the screen type.

18. The method of claim 13, further comprising transmitting the encoded bitstream to the receiving apparatus over a packet-based network.

19. The method of claim 13, further comprising transmitting the encoded bitstream to the receiving apparatus as part of a live video call.

20. The method of claim 13, wherein the bitstream forms a layer of a layered coding scheme.

* * * * *